United States Patent

Mizutani et al.

[11] Patent Number: 5,812,284
[45] Date of Patent: Sep. 22, 1998

[54] ELECTRONIC CIRCUIT APPARATUS

[75] Inventors: Hidemasa Mizutani; Mineto Yagyu, both of Sagamihara; Noriyuki Kaifu, Hachioji; Toshihiro Saika, Zama, all of Japan

[73] Assignee: Canon Kabushiki Kaisha, Tokyo, Japan

[21] Appl. No.: 345,001

[22] Filed: Nov. 25, 1994

Related U.S. Application Data

[63] Continuation of Ser. No. 951,086, Sep. 25, 1992, abandoned.

[30] Foreign Application Priority Data

Sep. 27, 1991 [JP] Japan ............................ 3-249202
Sep. 18, 1992 [JP] Japan ............................ 4-273545

[51] Int. Cl.$^6$ ............................................ H04N 1/04
[52] U.S. Cl. ..................... 358/482; 345/103; 250/208.3
[58] Field of Search ............................ 345/98–100, 104, 345/205, 206; 358/482, 355; 250/208.1, 208.2, 208.3, 208.4

[56] References Cited

U.S. PATENT DOCUMENTS

| | | | |
|---|---|---|---|
| 4,390,791 | 6/1983 | Hatanaka et al. | 250/578 |
| 4,405,857 | 9/1983 | Hirai et al. | 250/211 |
| 4,426,407 | 1/1984 | Morin et al. | 427/86 |
| 4,461,956 | 7/1984 | Hatanaka et al. | 250/578 |
| 4,471,371 | 9/1984 | Hamano | 357/31 |
| 4,583,126 | 4/1986 | Stoffel | 358/482 |
| 4,811,416 | 3/1989 | Nakamura | 358/482 |
| 4,827,345 | 5/1989 | Nakagawa et al. | 358/213.27 |
| 4,829,485 | 5/1989 | Hatanaka et al. | 365/239 |
| 4,866,291 | 9/1989 | Shimada et al. | 250/578 |
| 4,931,661 | 6/1990 | Fukaya et al. | 250/578.1 |
| 4,965,570 | 10/1990 | Hatanaka et al. | 340/825.79 |
| 5,060,071 | 10/1991 | Ino | 358/455 |
| 5,151,689 | 9/1992 | Kabuto et al. | 345/103 |
| 5,162,644 | 11/1992 | Nagata et al. | 358/482 |

FOREIGN PATENT DOCUMENTS

| | | | |
|---|---|---|---|
| 0400182 | 12/1990 | European Pat. Off. | H04N 1/18 |
| 0440282 | 8/1991 | European Pat. Off. | H04N 3/15 |
| 56-138969 | 10/1981 | Japan . | |
| 59-185474 | 10/1984 | Japan . | |
| 61-251168 | 11/1986 | Japan | H01L 27/14 |
| 62-066667 | 3/1987 | Japan | H01L 27/14 |
| 63-049737 | 3/1988 | Japan | G02F 1/133 |

OTHER PUBLICATIONS

International Electron Devices Meeting, 1986, Los Angeles, CA, Dec. 7–10, 1986, M.J. Thompson, et al., "Amorphous Si Electronic Devices And Their Applications".

*Primary Examiner*—Steven Saras
*Attorney, Agent, or Firm*—Fitzpatrick, Cella, Harper & Scinto

[57] ABSTRACT

An electronic circuit apparatus comprises an array of M×N functional elements, M×N switching elements provided in a one-to-one correspondence with the M×N functional elements, a shift register having M output lines, and a selector having N select lines. M control lines are commonly connected in units of N elements of the M×N switching elements. The M control lines are connected to the M output lines of said shift register. N input and/or output lines are commonly connected in units of M elements of the M×N switching elements. The N input and/or output lines are connected to the N select lines of the selector. Transistors constituting the shift register are thin-film transistors. And, transistors constituting the selector are transistors each having an active region consisting of a single-crystal semiconductor.

14 Claims, 21 Drawing Sheets

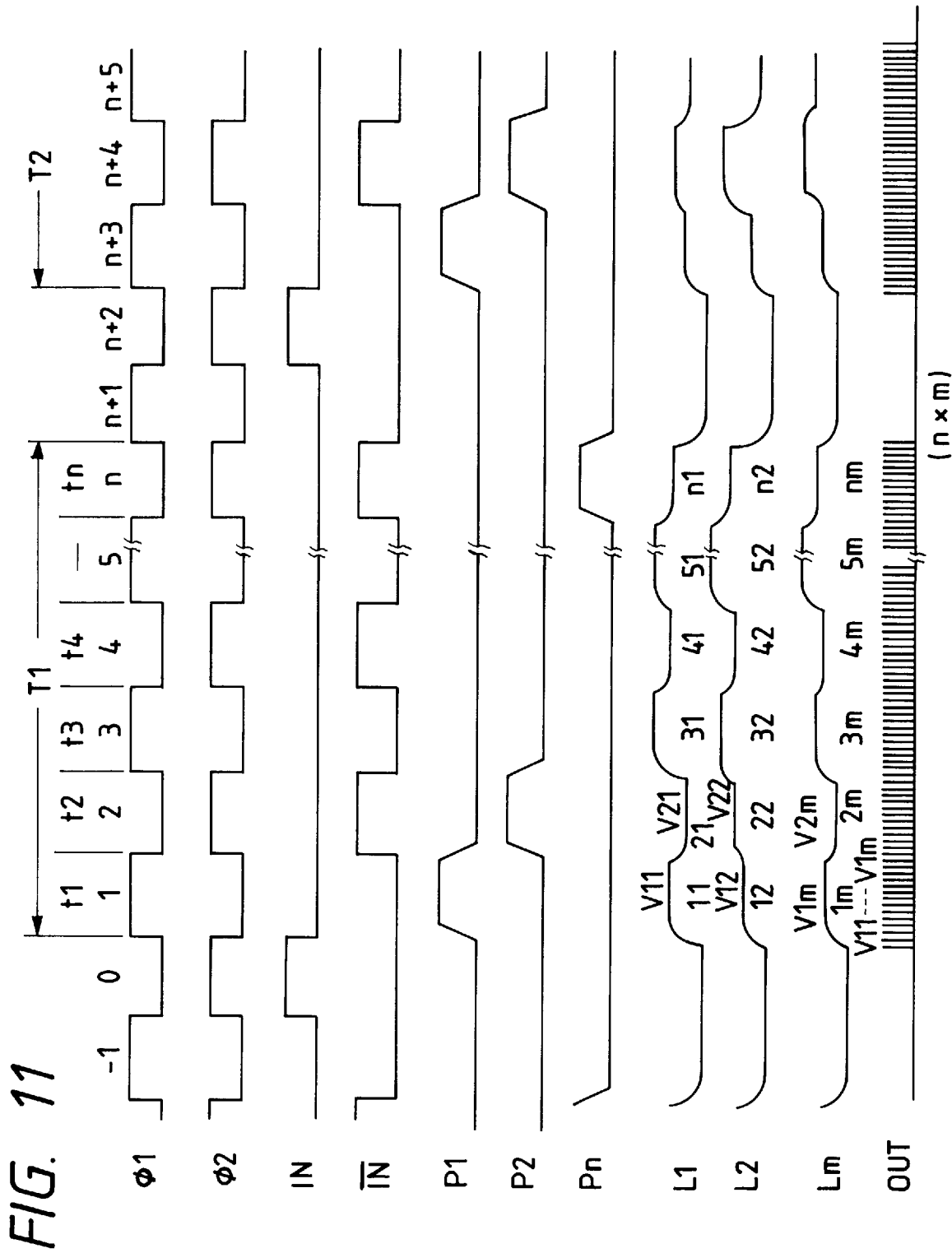

ELECTRONIC CIRCUIT APPARATUS

This application is a continuation of application Ser. No. 07/951,086 filed Sep. 25, 1992 now abandoned.

BACKGROUND OF THE INVENTION

1. Field of the Invention

The present invention relates to an electronic circuit apparatus, for example, an optical information input apparatus such as a facsimile apparatus, an image reader, a digital copying machine, a laser recording apparatus, or a bar-code reader, a display apparatus, or a light-emitting element array and, more particularly, to an electronic circuit apparatus for generating pulse signals for selectively driving a large number of functional elements and a structure of the same.

2. Related Background Art

In recent years, a demand has arisen for miniaturization of the overall size of an electronic circuit apparatus. This tendency similarly applies to a photoelectric converting apparatus applicable to an optical information input unit of, e.g., a facsimile apparatus, a digital copying machine, or a laser recording apparatus, or to an apparatus for reading characters or images written on an original. For this reason, remarkable progress has been made in the development of a photoelectric converting apparatus which has a light-receiving surface of a size equal to or almost equal to the size of an original image to be reproduced, which is excellent in resolution, which can precisely read an original image, and which is compact, i.e., a photoelectric converting apparatus having a so-called elongated light-receiving surface.

On the other hand, a liquid-crystal display for displaying an image or an LED printer, for example, is required to have a large screen or elongated structure while maintaining its small size.

The electronic circuit apparatus as described above, however, has a serious problem in its internal signal processor.

In the case of a photoelectric converting apparatus, for example, a signal processor occupies a very large space compared to a photoelectric converter. Therefore, although the length of an optical path can be made very short by elongating the photoelectric converter, the above problem makes it difficult to satisfactorily use this advantage of miniaturization.

As a means for solving this problem, a system in which pixels (photoelectric converting elements) of the photoelectric converter are grouped into a plurality of blocks is generally adopted. In this system, these blocks are wired in a matrix manner, and the signal processor is operated in units of blocks.

A problem in this matrix wiring is that a bonding step is required to connect the photoelectric converting elements to the signal processor in order to extract signals, and this bonding step is increased extremely in number unless the photoelectric converting elements and the signal processor are integrated together.

As a method of solving this problem, an arrangement has been proposed in which switch units for transferring signals from individual photoelectric converting elements are formed by thin-film transistors (TFTs) and a shift register for sequentially driving these transfer TFTs time serially is formed on the same substrate (U.S. Pat. No. 4,461,956, Japanese Laid-Open Patent Application No. 56-138969). This method will be described below with reference to FIG. 1.

FIG. 1 shows an equivalent circuit diagram of the photoelectric converting apparatus described above. This photoelectric converting apparatus comprises an array of n photoelectric converting elements (PE1, PE2, ..., PEN), capacitors (CE1, CE2, ..., CEN) as storage means for storing output signals from the photoelectric converting elements PE, transistors (SW1, SW2, ..., SWN) as transfer means for sequentially transferring the outputs from the photoelectric converting elements to an output terminal OUT, and a shift register (S11, ..., S16, ..., SN6) for allowing the transfer transistors to sequentially perform switching operations in a correct order.

Optical information incident on a light-receiving surface modulates the resistances of the photoelectric converting elements PE to change a current flowing from a power source V of the photoelectric converter into the storage capacitors CE. The electric charges stored in the storage capacitors CE are sequentially discharged from the output terminal OUT by switching on the N transfer transistors SW one by one in a predetermined order. That is, the incident optical information is time-serially extracted as the electric charges stored in the storage capacitors CE from the output terminal OUT during a time interval from one ON state to the next ON state of the transfer transistors SW.

Each stage of the shift register for driving one transfer transistor SW is constituted by six transistors. For example, a stage of the shift register for driving the transfer transistor SW1 is constituted by six transistors S11, S12, ..., S16.

FIG. 2 shows a timing chart of the shift register and the transfer transistors SW.

Transfer clocks $\phi_1$ and $\phi_2$ have opposite phases. After N clocks $\phi_1$ are counted, a transfer pulse is applied to a terminal IN. Each time two $\phi_1$ pulses are counted, the transfer transistors SW are driven into an ON state in sequence in an order of SW1, SW2, ..., SWN.

The photoelectric converting element PE is preferably a so-called ohmic sensor constituted by an electrode having ohmic junctions on both surfaces of a light acceptor layer. The transfer transistors and the transistors constituting the shift register are all thin-film transistors.

The light acceptor layer constituting the photoelectric converting element PE optimally consists of a semiconductor thin film, such as amorphous hydrogenated silicon (a-Si:H) or CdSe. This is so because these materials can function at low temperatures and allow a high degree of freedom in selection of the substrate.

If the transfer TFTs (thin-film transistors) SW and the TFTs S for the shift resistor consist of the same semiconductor, CdSe or a-Si:H, they can be formed through the same process, and short wiring can be designed because they can be formed close to each other.

As is generally known to those skilled in the art, however, these amorphous materials are inferior to single-crystal materials or polycrystalline materials in electrical characteristics, particularly the mobility of electrons and holes, which determines the speed of a transistor. Therefore, such an amorphous material poses problems in that it cannot completely transfer a signal within an assigned time when used as a transfer switch, that it cannot follow a high-frequency clock when used in a shift register, and that it cannot drive a transfer switch TFT for each bit at a necessary read rate. Of these problems, the problem as a transfer switch can be avoided by designing a TFT to have a high L/W (ratio of the channel length to width) so that its drive power is increased. Since, on the other hand, the speed of a shift register is determined essentially by the mobility of carriers, a simple delay in read rate per unit bit offers no problem in a photoelectric converting apparatus. However, current a-Si:H sometimes cannot meet a specification of reading out 1,728 bits (A4) in 5 msec as in a current G3 facsimile standard. That is, it is almost impossible to design a shift register for time-serially driving TFTs for individual bits in about 3 μsec by using current mass-producible a-Si:H.

Japanese Laid-Open Patent Application No. 59-185474 discloses an arrangement for solving the above problem, in which TFTs for a shift register consist of polysilicon (Poly-Si) having a higher mobility than that of a-Si:H.

In this conventional example, however, since Poly-Si itself has almost no function as a photoelectric converting element, a process of forming a-Si:H photoelectric converting elements is required in addition to the Poly-Si TFT process at 600° C. or more. This increases the number of fabrication steps, and the results are a reduction in yield and an increase in fabrication cost.

A shift register of this type will be described below.

As a buffer circuit for generating and amplifying a pulse for selective driving for use in a shift register, a buffer circuit using a bootstrap effect as shown in FIG. 3 has been conventionally widely used.

Referring to FIG. 3, the gate electrode of a first MIS (metal insulator semiconductor) field-effect transistor (to be referred to as a MIST hereinafter) Tr1 is connected to an input terminal D, its first electrode (serving as a source or drain electrode) is connected to a power terminal B, and its second electrode (serving as a source or drain electrode) is connected to the gate electrode of a second MIST Tr2 (this node will be referred to as a node A for convenience). The first electrode of the second MIST Tr2 is connected to an output terminal Q, and its second electrode is connected to a terminal C for receiving a sync pulse signal. The first electrode of a third MIST Tr3 is connected to the node A, its second electrode is connected to a predetermined reference voltage (in this case, the ground potential), and its gate electrode is connected to a reset terminal R. The output terminal Q is connected to a load L to be driven. A stray capacitance Ca is present between the node A and the ground, and a capacitance Cb mainly formed between the gate electrode and the second electrode of the MIST Tr2 is present between the node A and the sync pulse input terminal C.

The operation of the conventional circuit having the above arrangement will be described below with reference to FIG. 3 and a timing chart of FIG. 4. The description will be made by taking an n-channel MIST as an example and using a positive logic. However, exactly the same description can be made for a p-channel MIST if the polarity of a voltage is inverted.

Assume that at time t0, the input terminal D, the reset terminal R, the output terminal Q, the sync pulse terminal C, and the node A are in state "0".

When the input terminal D changes to "1" at time t1, the MIST Tr1 is turned on to charge the capacitances Ca and Cb connected to the node A, and this raises the potential at the node A. At this time, since the first and second electrodes of the MIST Tr2, i.e., the terminal C and the output terminal Q remain at "0", the MIST Tr2 does not operate.

When the input terminal D changes to "0" at time t2, the MIST Tr1 is turned off, but the potential at the node A is kept at "1".

Subsequently, when a sync pulse is applied to the terminal C to raise the terminal C to "1" at time t3, the MIST Tr2 is turned on because a potential difference is produced between the first and second electrodes of the MIST Tr2 and the node A as its gate electrode is in state "1", and this raises the output terminal Q to "1". At this time, since the sync pulse is superposed on the potential at the node A by the bootstrap effect obtained by the capacitance Cb, the potential at the node A is increased to be higher than the potential held at the time t2. This makes it possible to raise the node A up to a voltage higher than the power source voltage. Therefore, the state "1" obtained at the output terminal Q can be a high voltage equal to the voltage of the sync pulse regardless of the threshold voltage of the MIST Tr2.

When the sync pulse goes to "0" at time t4, the MIST Tr2 is turned on in a direction opposite to that at the time t3 because the output terminal Q and the node A as its gate electrode remain at "1". As a result, a current flows from the output terminal Q to the terminal C to perform a reset operation by which the output terminal Q is lowered to "0".

When a reset pulse is applied to the reset terminal R at time t5, the MIST Tr3 is turned on to reset the potential at the node A to the ground potential, "0". This reset operation prevents turning on of the MIST Tr2 even when the sync pulse rises to "1" at time t6. The MIST Tr2 operates only when the input terminal D is raised to "1" and in this manner functions as a buffer circuit.

The buffer circuit constituted by these MISTs consumes a small amount of a current unlike a buffer circuit shown in FIG. 5 in which two inverters are connected. This buffer circuit also has advantages that the size of the MIST Tr2 is relatively small, the output voltage can be as high as the voltage of the sync pulse, and the circuit is hardly influenced by variations in threshold voltage of the MIST Tr2. In addition, the circuit can be fabricated by a standard IC fabrication process and can also be fabricated relatively easily by a thin-film transistor fabrication process using a polycrystalline or amorphous semiconductor.

In FIG. 3, whether the output terminal Q goes to "0" or "1" when the sync pulse rises to "1" is determined in accordance with whether the potential at the node A is in state "0" or "1". If the potential at the node A is raised to "1" by, e.g., a leakage current (OFF current) of the MIST Tr1 or external noise although the input is "0", the circuit malfunctions. Therefore, it is necessary to reliably reset the node A at state "0".

FIG. 6 shows an example of a malfunction in which the output terminal Q rises to "1" although no input is applied to the input terminal D if the potential at the node A is raised by a leakage current of the MIST Tr1 to exceed the threshold voltage of the MIST Tr2 and a sync pulse is applied to the terminal C.

To stably keep the node A in state "0", as shown in FIG. 7, a reset signal is kept applied to the reset terminal R to keep the MIST Tr3 on except when an input is applied to the input terminal D. In this method, the MIST Tr3 is generally almost always set on and is turned off only while an input is applied to the input terminal. This extremely increases the ON duty of the MIST Tr3.

In a switching element, such as a MIST, in which an electric field is applied from a gate electrode to a semiconductor through an insulating film to form a channel, electrons, in the case of an n-channel element, are trapped in defects in the interface between the insulating film and the semiconductor film upon turning on of the element, and this shifts the threshold voltage to a value higher than its initial value. It is generally considered that the amount of this shift is proportional to the value of a gate voltage applied and its duty.

For this reason, the MIST Tr3 in the buffer circuit as described above easily causes such a shift in threshold voltage, and this raises the value of the threshold voltage. Then the MIST Tr3 cannot be turned on even when a reset signal is applied to the reset terminal R, and this makes it impossible to reliably reset the node A to "0", thereby causing a malfunction.

The shift in threshold voltage can be reduced by removing defects in the interface between the insulating film and the semiconductor film and those in the individual films. In recent years, therefore, the shift in threshold voltage caused by defects in films is considerably eliminated in a MIST using crystalline silicon, but problems sometimes arise along with a decrease in device size or the like. The problem of a shift in threshold voltage is still a serious problem in a thin-film transistor (to be referred to as a TFT hereinafter) using a material other than crystalline silicon, e.g., polysilicon or amorphous silicon (to be referred to as a-Si hereinafter).

FIG. 8 shows the relationship between the application time of a gate voltage of +12 V to the gate electrode of a TFT using a-Si and the shift amount in threshold voltage. As shown in FIG. 8, the threshold voltage which is initially 1 V is shifted to about 8 V when the gate voltage of +12 V is continuously applied for 250 hours. FIG. 9 shows the VGS–√IDS characteristic of this TFT. Referring to FIG. 9, a solid line indicates the characteristic in the initial state, and a broken line indicates those obtained after an operation of 250 hours. The ON current for VGS=12 V obtained after an operation of 250 hours is decreased to ¹⁄₁₀ times or less that in the initial state. If a TFT having such a characteristic is used as the transistor Tr3 for resetting, although the TFT can normally perform a reset operation in its initial state, it cannot perform a satisfactory reset operation any longer as the operation time elapses, and finally causes a malfunction.

To prevent this malfunction, the gate voltage to be applied to the gate electrode may be raised to correspond to the shift in threshold voltage. If the gate voltage is set at a high value, the shift amount in threshold voltage is increased in proportion to the value. However, since the gate voltage and the shift amount in threshold voltage are in a linear proportional relationship, a large amount of an ON current can be constantly flowed if the gate voltage is set high.

That is, assuming that an ON current IDS is represented by Equation (1) and a shift amount ΔVTH in threshold voltage is represented by Equation (2), an ON current IDS' after a durability operation is given by Equation (3):

$$IDS = K(VGS - VTH)^2 \quad (1)$$

$$\Delta VTH = \alpha VGS \quad (2)$$

$$IDS' = K\{(1-\alpha)VGS - VTH\}^2 \quad (3)$$

where VGS is the gate voltage, K is a constant of proportion, VTH is the threshold voltage, and α is a constant of proportion representing the relationship between the shift amount in threshold voltage and the gate voltage.

An ON current IDS" after a durability operation performed by increasing the gate voltage by n times is given by Equation (4) by substituting VGS=nVGS into Equation (3):

$$IDS'' = K\{n(1-\alpha)VGS - VTH\}^2 \quad (4)$$

Since n>1 and 0≦α≦1, IDS" is always larger than IDS'. In this manner, a large ON current can be flowed even after a durability operation if the gate voltage is raised, and this prevents a malfunction.

When the voltage to be applied to a circuit is raised, however, matching with other peripheral circuits may be degraded. It is also necessary to modify all the other peripheral circuits to correspond to the high voltage. Although another power source may be prepared for other circuits, the use of a plurality of power sources makes it very difficult to use the circuit.

SUMMARY OF THE INVENTION

It is an object of the present invention to provide an electronic circuit apparatus having an essential operating speed higher than those of conventional apparatuses.

It is another object of the present invention to provide an electronic circuit apparatus which malfunctions less frequently than conventional apparatuses.

An electronic circuit apparatus of the present invention comprises an array of M×N functional elements, M×N switching elements provided in a one-to-one correspondence with the M×N functional elements, a shift register having M output lines, and a selector having N select lines, wherein M control lines are commonly connected in units of N elements of the M×N switching elements, the M control lines are connected to the M output lines of the shift register, N input and/or output lines are commonly connected in units of M elements of the M×N switching elements, the N input and/or output lines are connected to the N select lines of the selector, transistors constituting the shift register are thin-film transistors, and transistors constituting the selector are transistors each having an active region consisting of a single-crystal semiconductor.

According to the above electronic circuit apparatus of the present invention, an electronic circuit apparatus having an elongated or large area can be manufactured at a low cost without decreasing the essential scan rate. Therefore, an inexpensive and high-performance electronic circuit apparatus can be provided.

Another electronic circuit apparatus of the present invention is characterized in that a gate electrode of a first transistor is used as an input terminal, a first main electrode of the first transistor is connected to a power source or the input terminal, a second main electrode of the first transistor is connected to a gate electrode of a second transistor, a first main electrode of the second transistor is used as an output terminal, a sync pulse is applied to a second main electrode of the second transistor, a plurality of reset transistors are connected to the gate electrode of the second transistor, and reset pulses having different timings are applied to gate electrodes of the plurality of reset transistors.

According to the above electronic circuit apparatus of the present invention, a plurality of reset transistors are provided, and reset pulses are applied to the transistors at different timings. Therefore, the ON time of each transistor can be shortened, and this can decrease the shift in threshold voltage. As a result, a reduction in ON current with the shift in threshold voltage of the transistor can be suppressed, and this enables a reliable reset operation of a node. Therefore, it is possible to provide an electronic circuit apparatus having a simple arrangement and including a highly reliable buffer circuit which does not malfunction even after a long-time operation.

Still another electronic circuit apparatus of the present invention is characterized in that a gate electrode of a first transistor is used as an input terminal, a first main electrode of the first transistor is connected to a power source or the input terminal, a second main electrode of the first transistor is connected to a gate electrode of a second transistor, a sync pulse is applied to a second main electrode of the second transistor, a reset transistor is connected to the gate electrode of the second transistor, the sync pulse is applied to a gate electrode of the reset transistor through a capacitive element, and a voltage higher than a power source voltage is applied to the gate electrode of the reset transistor.

According to the above electronic circuit apparatus of the present invention, the sync pulse is applied to the gate of the reset transistor through the capacitive element, so a voltage higher than the power source voltage is generated by a bootstrap effect. Since this voltage is applied to the gate electrode of the reset transistor, a reduction in ON current can be essentially suppressed even when the threshold voltage is shifted, and this makes it possible to reliably reset a node A. Therefore, it is possible to provide an electronic circuit apparatus having a simple arrangement and including a highly reliable buffer circuit which does not malfunction even after a long-time operation.

BRIEF DESCRIPTION OF THE DRAWINGS

FIG. 11 is a timing chart for explaining a method of driving the photoelectric converting apparatus according to the embodiment of the present invention;

DETAILED DESCRIPTION OF THE PREFERRED EMBODIMENTS

Figure 1:
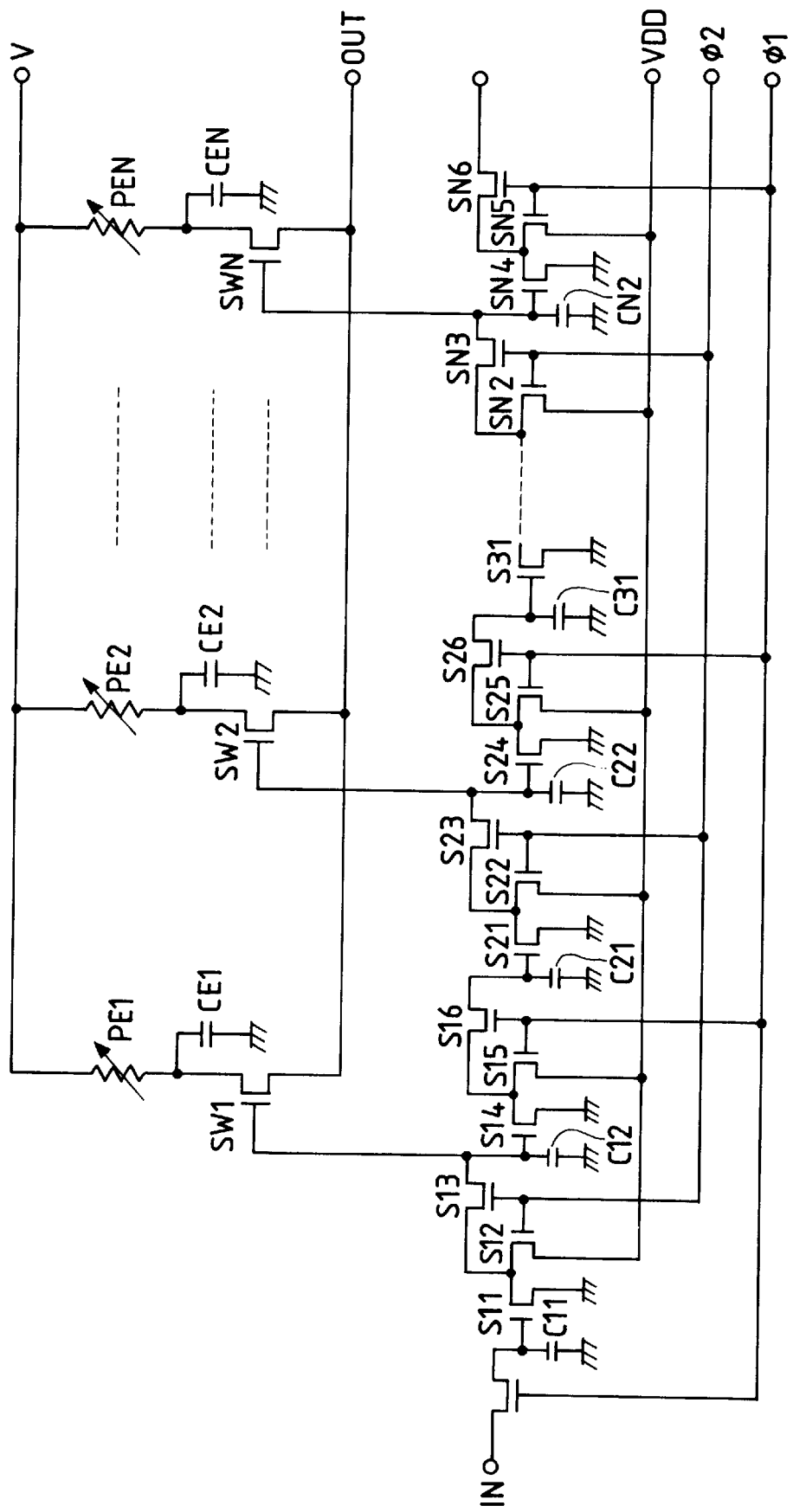
FIG. 1 is a circuit diagram showing a conventional photoelectric converting apparatus.
Figure 2:
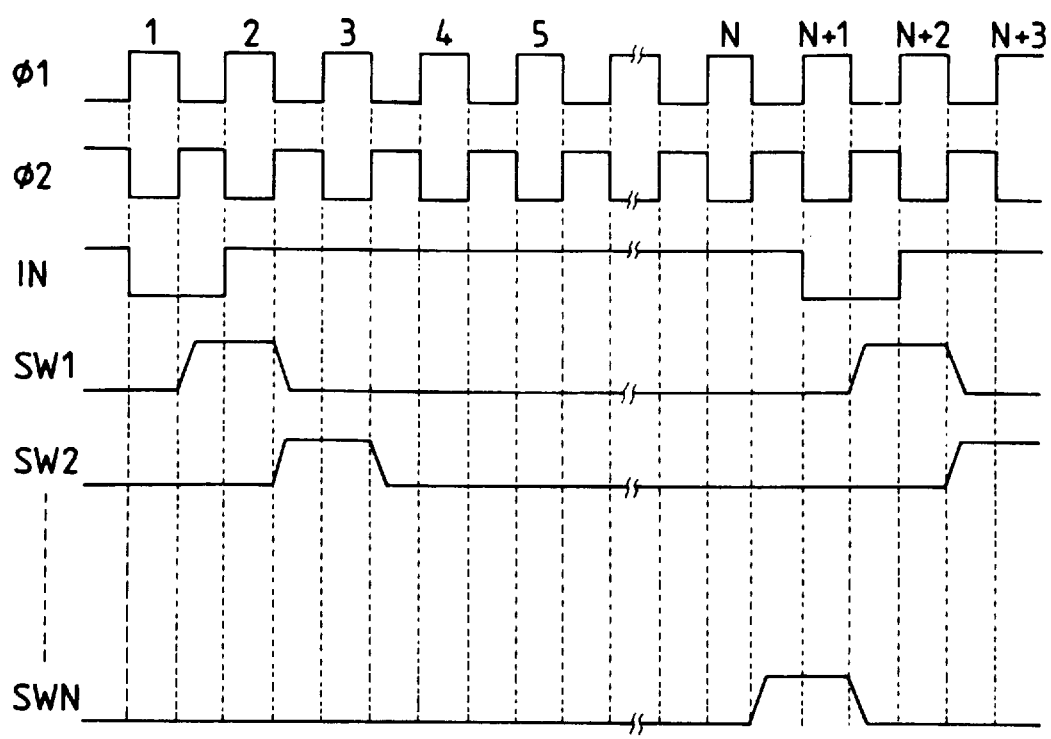
FIG. 2 is a timing chart for explaining a method of driving the conventional photoelectric converting apparatus.

Examples of an electronic circuit apparatus usable in the present invention are an apparatus for converting optical information into electrical information and an apparatus for converting electrical information into optical information.

A representative example of the former apparatus is a photosensor such as an image sensor, and that of the latter apparatus is a liquid-crystal apparatus (LC apparatus) such as a liquid-crystal display (LC display).

A functional element usable in the present invention is a photoelectric converting element such as a photoconducting element or a photovoltaic element. Practical examples of the element are a photodiode, a phototransistor, and a photothyristor.

The functional element may also be an element containing a liquid-crystal material sandwiched between a pair of electrodes, such as a liquid-crystal element (LC element), a light-emitting diode, or an electron-emission element.

A switching element is preferably a 3-terminal element having two main electrodes and a control electrode (gate electrode) for controlling a current flowing between the main electrodes. Practical examples of the switching element are a field-effect transistor and a bipolar transistor.

An active region for controlling the operation of the functional element mainly consists of a semiconductor material. In the case of an LC element, most of the region consists of a nematic crystal or a smectic crystal.

As the semiconductor material, a tetrahedral-based material, such as silicon, germanium, or diamond, a Group III-V compound, or a Group II-VI compound is used. The crystal structure of the semiconductor can be any of single-crystal, polycrystalline, fine-crystal, and amorphous. To increase the area of the electronic circuit or to elongate the electronic circuit, a non-single-crystal material which facilitates formation of a thin film is desired.

The first aspect of the present invention has been made in consideration of the fact that the operating speed of a transistor containing a non-single-crystal material as its active region is lower than that of a single-crystal transistor, and is characterized in that the scan rate of a functional element is increased, even when a shift register constituted by non-single-crystal transistors is used, to be equivalent to that obtained by a shift register constituted by single-crystal transistors by improving the circuit configuration.

The second and third aspects of the present invention are made to prevent a malfunction of a buffer circuit used in a shift register and the like. Although the second or third aspect of the present invention is applicable regardless of whether a transistor is a single-crystal transistor, the effect of the present invention is remarkable especially when a transistor is a non-single-crystal transistor.

Although the preferred embodiments of the present invention will be described below, the present invention is not limited to these embodiments, but various modifications or combinations of the individual components can be made provided that the objects of the present invention are achieved.

(1st Embodiment)

Figure 10:
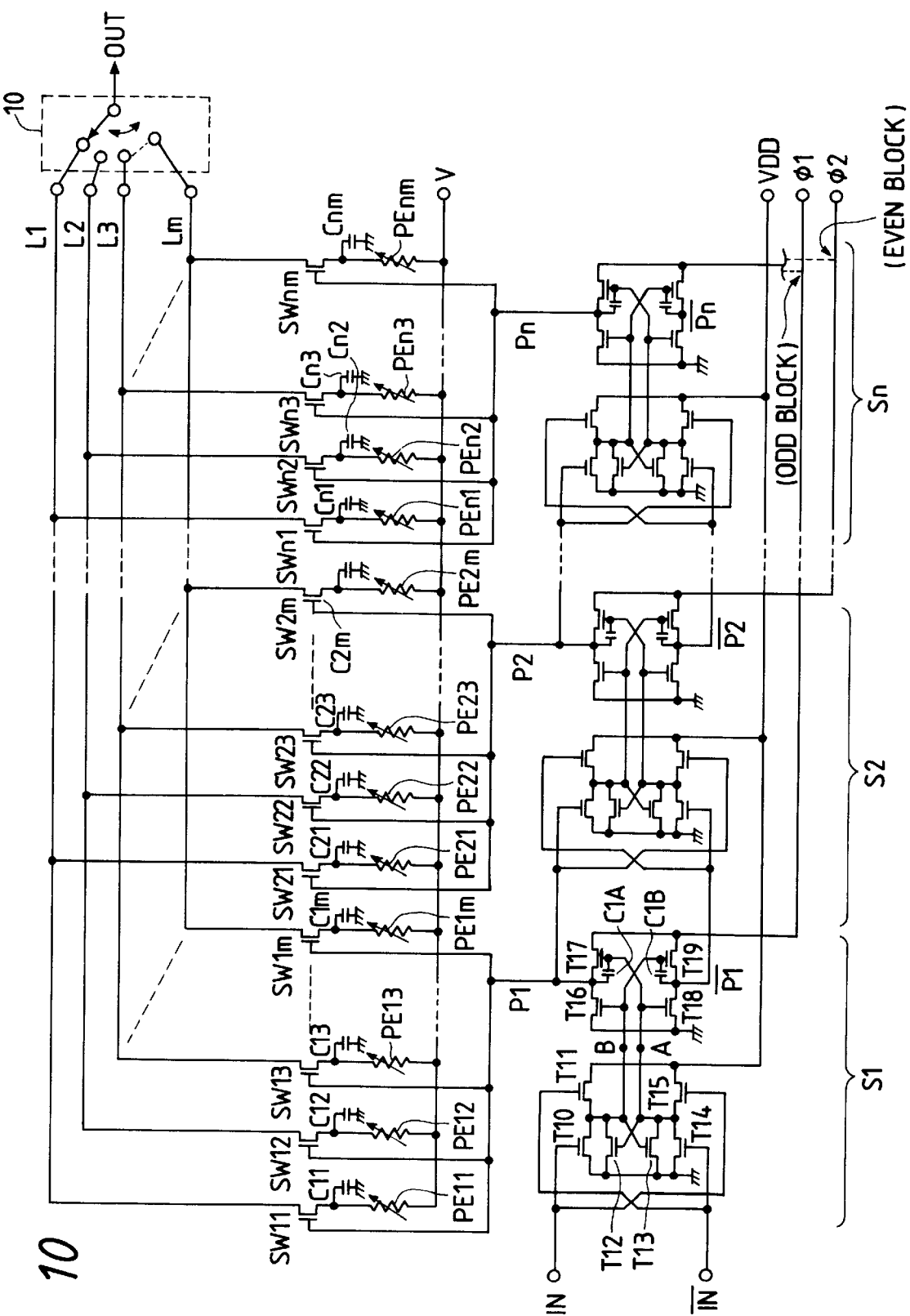
FIG. 10 is a circuit diagram showing a photoelectric converting apparatus according to an embodiment of the present invention.

FIG. 10 is an equivalent circuit diagram showing a photoelectric converting apparatus according to the first embodiment of the present invention.

This photoelectric converting apparatus comprises an array of N=n×m photoelectric converting elements ($PE_{1l}$, $PE_{1m}$, $PE_{2l}$, ..., $PE_{2m}$, ..., $PE_{nm}$) as functional elements, capacitors ($C_{1l}$, ..., $C_{1m}$, $C_{2l}$, ..., $C_{2m}$, ..., $C_{nm}$) as storage means for storing output signals from the photoelectric converting elements PE, switching transistors ($SW_{1l}$, ..., $SW_{1m}$, $SW_{2l}$, ..., $SW_{2m}$) as transfer means for sequentially transferring the outputs from the photoelectric converting elements to an output terminal OUT, and a shift register (S1, ..., S2, ..., Sn) for allowing the transfer transistors to perform switching operations in sequence in a correct order.

Optical information incident on a light-receiving surface changes the resistance of each photoelectric converting element, and this changes a current flowing from a power source V of a photoelectric converter into each storage capacitor CE. As a result, an electric charge corresponding to image information is stored in each storage capacitor CE.

Referring to FIG. 10, m light-receiving elements $PE_{1l}$ to $PE_{1m}$ constitute one block, and n such blocks constitute the entire light-receiving element array. This arrangement similarly applies to the storage capacitors $C_{1l}$ to $C_{1m}$ and the transfer transistors $SW_{1l}$ to $SW_{1m}$ provided in a one-to-one correspondence with the light-receiving elements $PE_{1l}$ to $PE_{1m}$.

Outputs from light-receiving elements having the same number in the individual blocks, for example, the light-receiving elements $PE_{1l}$, $PE_{2l}$, ..., $PE_{nl}$ are connected to a common line $L_1$ through the transistors $SW_{1l}$, $SW_{2l}$, ..., $SW_{nl}$, respectively.

Likewise, outputs from the light-receiving elements $PE_{12}$, $PE_{22}$, ..., $PE_{n2}$ are connected to a second common line L2 through the transfer switches $SW_{12}$, $SW_{22}$, ..., $SW_{n2}$, and m such common lines which are equal in number to the m light-receiving elements in one block are connected as output lines Ll to Lm to a multiplexer 10.

The gate electrodes of the transfer switches $SW_{1l}$ to $SW_{1m}$ for the first block are connected to an output terminal $P_1$ of the first stage $S_1$ of the shift register, and m bits are simultaneously ON/OFF-controlled by the output terminal $p_1$. The second to nth blocks are similarly connected to output terminals $P_2$ to $P_n$ of the second to nth stages of the shift register.

A power source voltage V is applied in common to the individual photoelectric converting elements, thereby constituting a matrix driver consisting of the gate as the control electrode of the transistor serving as the transfer switch and the source or drain electrode as its main electrode. The shift register is applied with clocks $\phi_1$ and $\phi_2$, a transfer pulse IN, and an inverted pulse $\overline{IN}$ together with a power source voltage $V_{DD}$.

The shift register for driving the transfer transistors SW is arranged such that an output from one stage of the shift register corresponds to m transfer transistors. The first stage of the shift register corresponding to the transfer transistors $SW_{1l}$ to $SW_{1m}$ of the first block is constituted by ten transistors $T_{10}, T_{11}, \ldots, T_{19}$ and two capacitors $C_{1A}$ and $C_{1B}$.

The operation of the shift register will be briefly described first with reference to a timing chart shown in FIG. 11. Clocks having opposite phases are applied to $\phi_1$ and $\phi_2$, a transfer pulse is applied to IN, and a pulse obtained by subtracting the pulse of IN from $\phi_2$ is applied to $\overline{IN}$.

When a transfer pulse is applied to IN while $\phi_1$ is in state Lo, $T_{10}$ and $T_{15}$ are turned on. In this case, $T_{11}$ and $T_{14}$ are kept OFF. Therefore, the node A rises to level Hi while the node B goes to level Lo, so $T_{12}$ is turned on, and $T_{13}$ is turned off. At the same time, $C_{1A}$ is charged, and $C_{1B}$ is discharged. At the next timing, if IN and $\overline{IN}$ are lowered to state Lo and $\phi_1$ is inverted to Hi, $T_{17}$ and $T_{18}$ are turned on, and $T_{16}$ and $T_{19}$ are turned off. Therefore, P1 rises to Hi, and $\overline{P1}$ goes to Lo.

If a pulse is applied to $\overline{IN}$ while no pulse is applied to IN, P1 goes to Lo while $\overline{P1}$ rises to Hi in contrast to the above description. That is, pulses at IN and $\overline{IN}$ are applied to P1 and $\overline{P1}$ with a half clock delay to $\phi_1$. Since the output P1 and the inverted output $\overline{P1}$ are applied to terminals of the second stage corresponding to the transfer pulse IN and the inverted pulse $\overline{IN}$, the transfer pulse IN is shifted to P1, P2, ..., Pn at every half clock of $\phi_1$.

Figure 4:
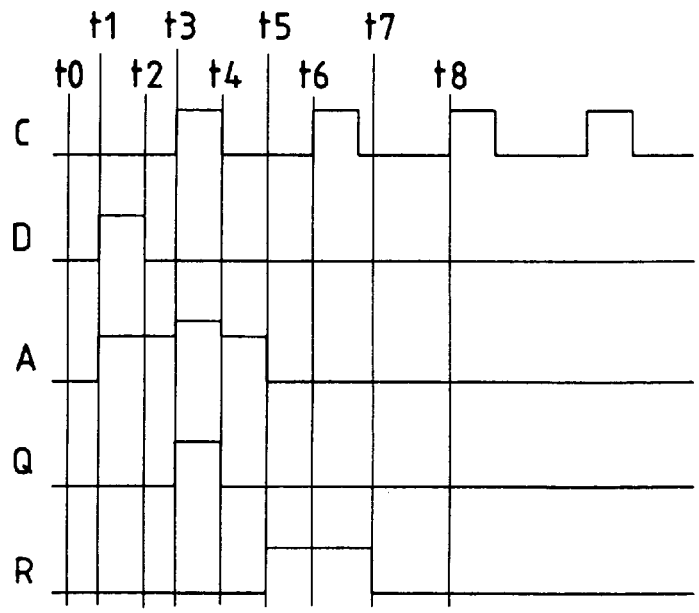
FIG. 4 is a timing chart for explaining the operation of the conventional buffer circuit shown in FIG. 3.

The operation of the photoelectric converting apparatus of this embodiment will be described in detail below with reference to the timing chart shown in FIG. 4.

When light is incident on the photosensors $PE_{1l}$ to $PE_{nm}$, electric charges from the power source V are stored in the capacitors $C_{1l}$ to $C_{nm}$ in accordance with the intensity of the light.

At first time t1 after application of the transfer pulse IN, the first parallel terminal P1 of the shift register outputs a high level, and this simultaneously turns on the transfer transistors $SW_{1l}$ to $SW_{1m}$ of the first block. As a result, the signal charges stored in the capacitors $C_{1l}$ to $C_{1m}$ are transferred to the output lines $L_1$ to $L_m$, respectively, and their output values $V_{11}, V_{12}, \ldots, V_{1m}$ are applied to the multiplexer 10.

The multiplexer 10 time-serially selects outputs from the output lines $L_l$ to $L_m$ within the time t1. As a result, optical information of the first block is read out as an OUT signal in the form of time-serial information of $V_{1l}$ to $V_{1m}$.

At the next time t2, the second parallel terminal P2 of the second stage S2 of the shift register rises to level HIGH, and this drives the m transfer transistors $SW_{2l}$ to $SW_{2m}$ of the second block into an ON state.

In this case, the parallel terminal of the first stage $S_1$ and those of stages from the third stage $S_3$ are at level LOW, and the transfer transistors of the first stage and those of stages from the third stage are in an OFF state. Similar to the first block, outputs $V_{21}$ to $V_{2m}$ from the second block are supplied to the multiplexer 10 through the output lines $L_1$ to $L_m$ and converted into time-serial signals by the multiplexer 10 within the time t2.

The same operation is repeatedly performed for the n stages, and a total bit number of N=n×m outputs are output time-serially within time T=t1+t2, . . . , +tn. If the transfer transistors for the respective bits are to be individually driven as in a conventional apparatus, the drive frequency of the shift register must be $f_0$=N/T. However, the apparatus of this embodiment can operate at f=n/T and therefore can cope with a low speed of 1/m. A read operation for the next line is started by the second transfer pulse IN.

The device structure of this embodiment will be described below.

The photoelectric converting element PE is preferably a so-called ohmic sensor constituted by an electrode having ohmic junctions on both surfaces of a light acceptor layer. The transfer transistors and the transistors constituting the shift register are all thin-film transistors.

Amorphous hydrogenated silicon (a-Si:H), amorphous silicon carbide (a-SiC), or CdSe as a non-single-crystal semiconductor thin film can be used as the light acceptor layer constituting the photoelectric converting element PE. In particular, a-Si:H can be optimally used as the material. These materials can be rendered n-type or p-type by doping an element of Group V-A of the periodic table, such as N, P, As, Sb, or Bi or an element of Group III-A of the periodic table, such as B, Al, Ga, In, or Tl, as an impurity. In addition, these materials have a high degree of freedom, i.e., they can be used at low temperatures and impose no limitations on the material of a substrate. The thin-film transistors constituting the transfer transistors and the shift register are formed using the same material in accordance with the same process.

In the present invention, although the thickness of the light acceptor layer is determined by the degree of diffusion of photocarriers produced upon incidence of optical information, it is generally 4,000 Å to 2 μm, preferably 6,000 Å to 1.5 μm. It is desirable that the thickness of the semiconductor layer of the thin-film transistor be smaller than that of a depletion layer produced by a voltage applied to the gate electrode formed via the insulating layer. The thickness is preferably 4,000 Å to 1 μm.

A light-transmitting material is adopted as the material of a substrate on which the photoelectric converting elements and the thin-film transistors are formed if optical information is incident on the light-receiving surface of the photoelectric converting element from the substrate side. If, however, optical information is incident on the light-receiving surface from the side of the photoelectric converting element formed on the surface opposite to the substrate, the above limitation can be omitted.

Many of commercially available or obtainable materials can be preferably used as the material of the substrate of the present invention as long as they are excellent in flatness, surface smoothness, a heat resistance, and resistances against various chemicals used in fabrication. Practical examples of the substrate forming material are light-transmitting materials, such as glass, Corning 7059 glass (available from Corning Glass Works), magnesia, beryllia, spinel, and yttrium oxide, and non-light-transmitting materials, such as aluminum, molybdenum, special stainless steel (SuS, Japan Industrial Standard), and tantalum.

The multiplexer 10 is constituted by an external semiconductor IC consisting of single-crystal silicon.

According to this embodiment, the shift register constituted by the non-single-crystal transistors performs scanning between the blocks, which satisfactorily functions at a relatively low scan rate, and the multiplexer as the selector consisting of single-crystal transistors performs scanning inside each block, which requires a relatively high scan rate. As a result, the embodiment can achieve a high performance equivalent to that obtained when all the circuits are constituted by single-crystal transistors. This makes it possible to fabricate the circuits easily at a low cost without degrading the performance.

If the photoelectric converting elements ($PE_{11}$ to $PE_{nm}$) shown in FIG. 10 are replaced with LC elements represented by capacitor symbols or LEDs, an LC apparatus or an LED array is provided, respectively.

A G3 facsimile standard photoelectric converting apparatus fabricated by forming photoelectric converting elements, transfer transistors, and a shift register on a single glass substrate by using an a-Si:H semiconductor layer will be described below.

FIGS. 12A to 13F show the fabrication steps of the apparatus. The apparatus comprises a sensor unit 101, a capacitor unit 102, a TFT unit 103 of a switch and a shift register, and a wiring portion 104.

Figure 12A:
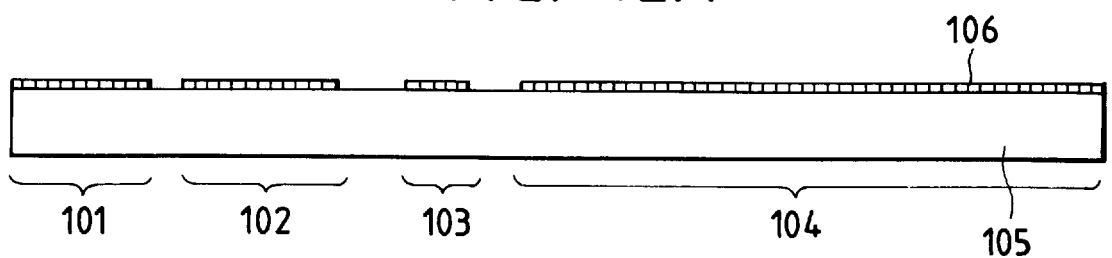
FIGS. 12A to 12D are sectional views for explaining the first half of a method of fabricating the photoelectric converting apparatus according to the embodiment of the present invention.
Figure 12B:
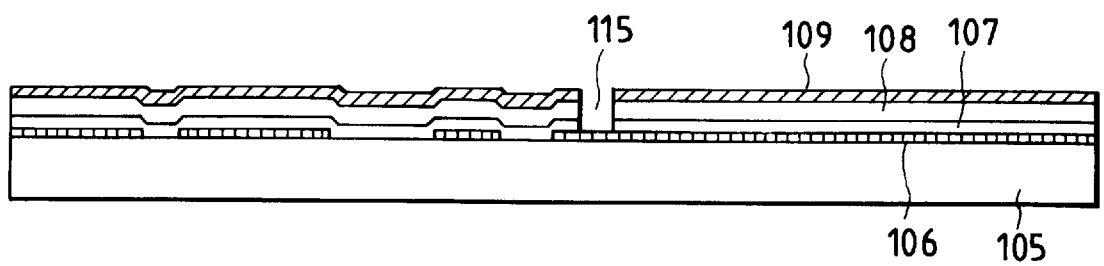
Figure 12C:
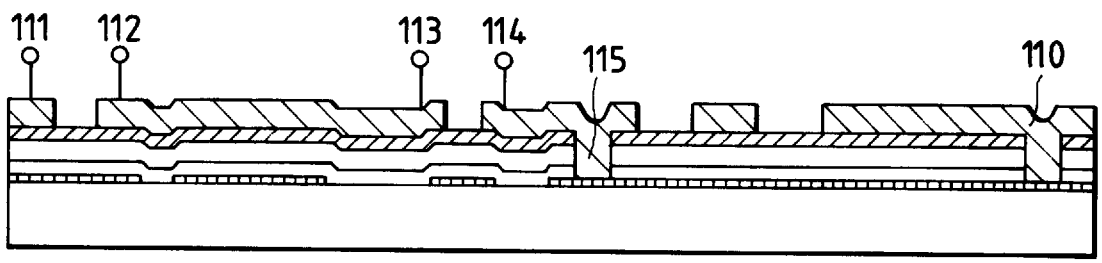

A gate electrode 106 is selectively formed by Al/Cr on a support 105 as an insulating substrate (step in FIG. 12A). Subsequently, a 3,000-Å thick hydrogenated amorphous silicon nitride film (a-SiNx:H to be referred to as a silicon nitride film hereinafter) serving as a gate insulating film 107, a 5,000-Å thick hydrogenated amorphous silicon (to be referred to as a-Si:H hereinafter) nondoped layer 108 serving as a first thin-film semiconductor, and a 1,000-Å thick $n^+$-type layer 109 as an amorphous silicon layer containing an n-type impurity are sequentially deposited by a plasma CVD process (step in FIG. 12B). In this case, the film formation temperature of the silicon nitride film serving as the gate insulating film 107 is about 350° C., a film formation temperature $T_{S1}$ of the hydrogenated amorphous silicon i layer 108 serving as the thin-film semiconductor is about 200° C., and the film formation temperature of the $n^+$-type layer 109 is about 200° C.

This $n^+$-type layer is formed to obtain an ohmic junction between the light-receiving surface and the i layer of a-Si and between the upper Al pixel electrode and the i layer.

1-μm thick aluminum serving as source and drain electrodes 111, 112, 113, and 114 is deposited by a sputtering process, and a photosensitive resist (photosensitive resin) for patterning the source and drain electrodes is coated. The coated photosensitive resist is patterned into a desired shape, and the source and drain electrodes are formed by wet etching by using the patterned photosensitive resist as a mask (step in FIG. 12C).

Subsequently, exposed portions of the $n^+$-type layer 109 between portions of the patterned photosensitive resist are etched away by RIE by using the photosensitive resist as a mask, and the photosensitive resist is stripped (step in FIG. 12D).

Wiring between the thin-film transistors and an electrical connection between the thin-film transistors and the photoelectric converting element are formed by wiring patterns between the gate electrode layer and the source-drain electrode layer electrically isolated from each other by the insulating layer 107. These two layers are connected through a hole 115 formed in the insulating layer.

Figure 12D:
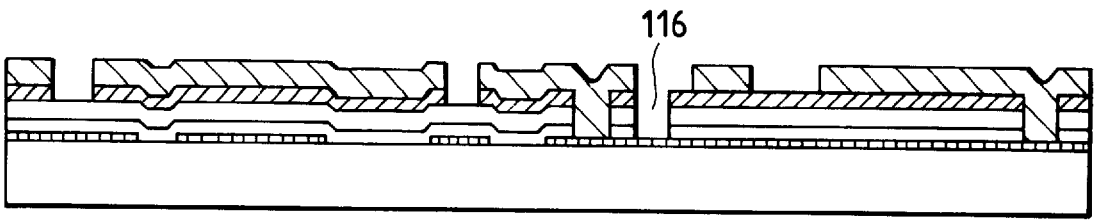

After the photoresist is patterned into a desired shape, the layers in an unnecessary portion 116 are removed by RIE to perform element isolation (step in FIG. 12D).

Figure 13E:
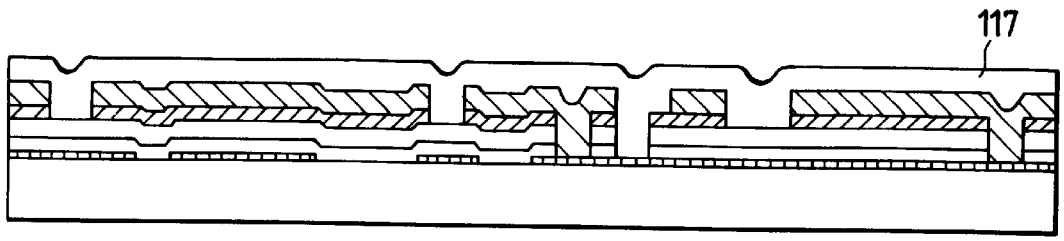
FIGS. 13E and 13F are sectional views for explaining the second half of the method of fabricating the photoelectric converting apparatus according to the embodiment of the present invention.

In addition, a protective layer 117 consisting of a silicon nitride film is formed by the plasma CVD process on the surface of the thin-film semiconductor formed in the step shown in FIG. 12D (step in FIG. 13E).

This silicon nitride film is preferably deposited by using a gas mixture of $SiH_4$ and $NH_3$ at a film formation temperature $T_{S2}$ of 150° C. by the plasma CVD process.

After formation of the silicon nitride film as the protective film, a 50-μm thick thin glass plate 119 is adhered using an adhesive layer 118, and annealing is finally performed at an annealing temperature $T_A$ of 200° C. for one hour. As a result, an original reading apparatus constituted by the TFT sensor 101, the capacitor unit 102, the TFT unit 103, and the matrix wiring portion 104 is obtained (step in FIG. 13F).

The switching transistors and the transistors for the shift register have the same basic structure as the TFT unit 103.

Figure 13F:
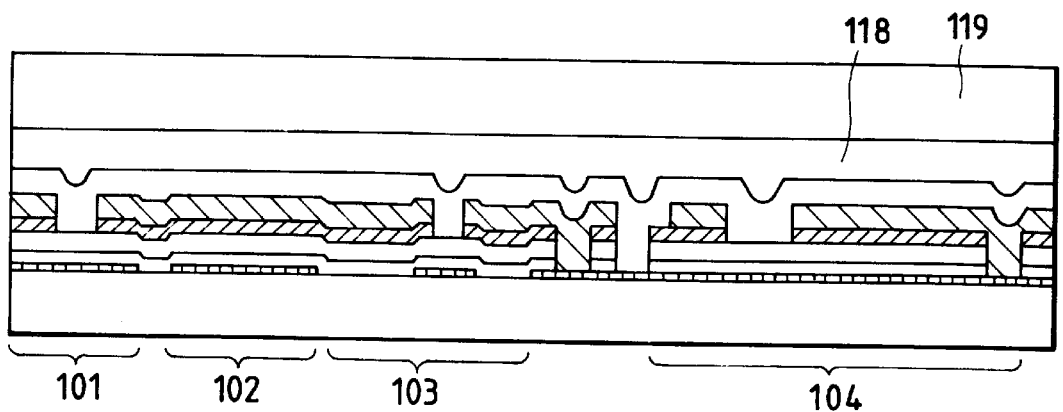
Figure 14:
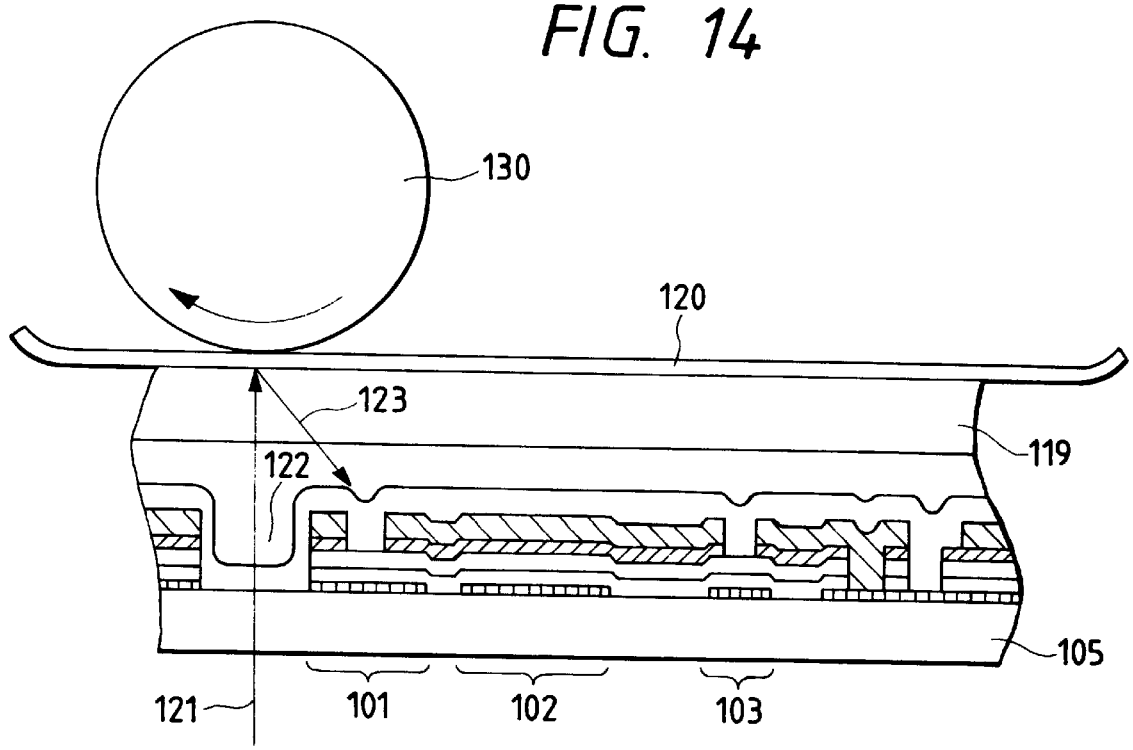
FIG. 14 is a sectional view showing a system in which the photoelectric converting apparatus according to the embodiment of the present invention is incorporated in an information processing apparatus.

FIG. 14 schematically shows an embodiment of an information processor for performing an original read operation by using the above photoelectric converting apparatus. Illumination light 121 from a light source (not shown) passes through the transparent substrate 105 and illuminates a portion of an original 120 in contact with the thin glass plate 119 through a sensor window 122 from which the thin-film layer is removed. Reflected light 123 from that portion is incident on the sensor unit 101 to produce a photocurrent. This photocurrent produced by the light incident on the sensor unit 101 is stored in the capacitor unit 102, and the stored charge is transferred by the TFT unit 103 of the switching transistor driven by a signal from the shift register constituted by transistors having the same structure as the TFT unit. Signals of all pixels in the main scan direction are read out in units of blocks by driving of the shift register, and at the same time pixel signals of the entire original are read out as the original 120 is fed in the sub scan direction by a roller 130. As shown in the step of FIG. 13F, the read wiring unit has a matrix wiring structure using two electrode layers so that a plurality of bits in one block can be read out through a common line for the blocks in correspondence with block driving by the shift register.

Figure 15:
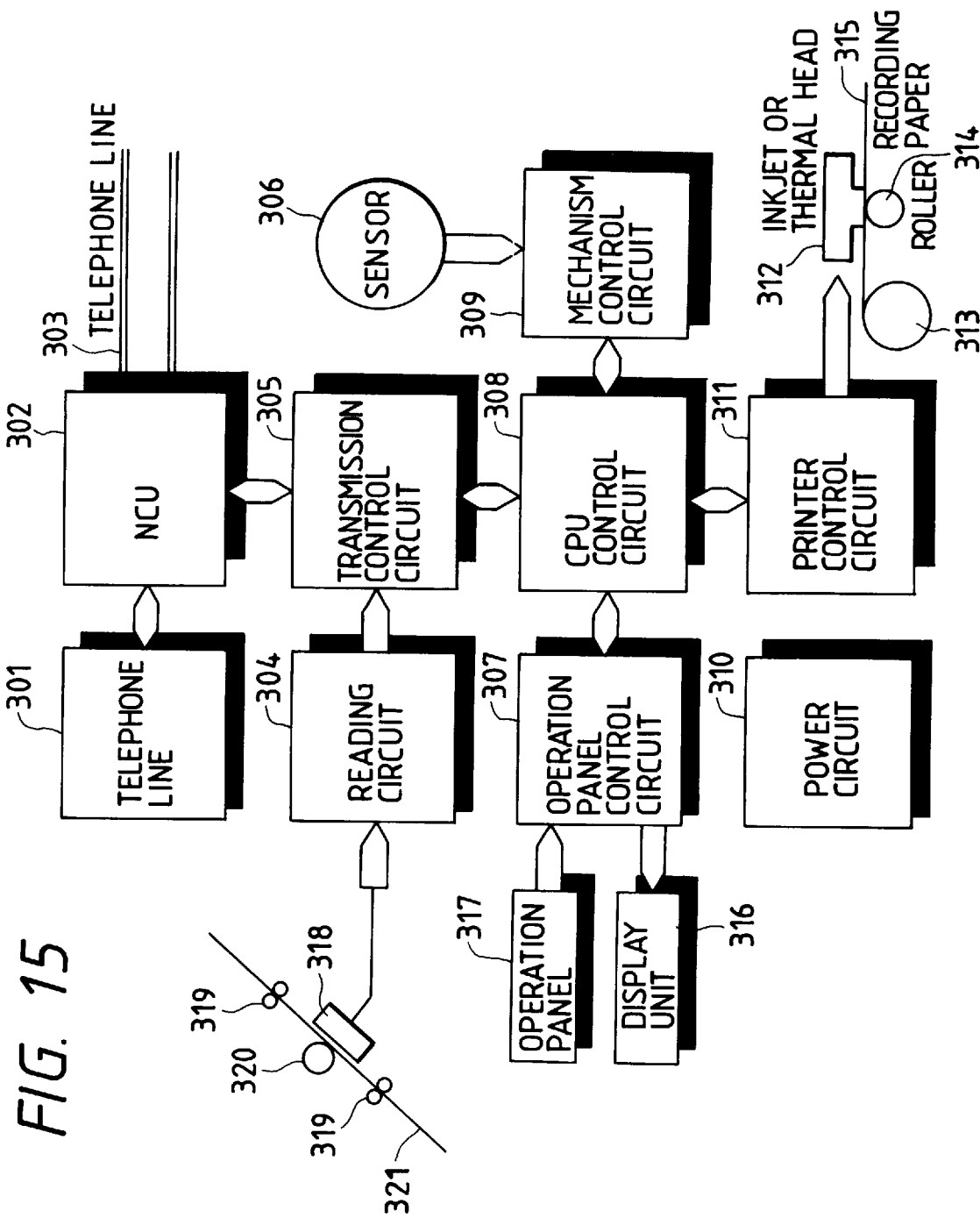
FIG. 15 is a block diagram for explaining an embodiment of an electronic circuit apparatus according to the present invention.

FIG. 15 is a block diagram showing a control system of a facsimile apparatus as an electronic circuit apparatus.

When an operator sets an original 321, the original is fed to a read position of a sensor 318 by feed rollers 319 and 320. A signal input to an operation panel 317 is transferred to a CPU 308 through an operation panel control circuit 307, and the CPU outputs an instruction for performing a transmission operation to a transmission control circuit 305. The signal from the sensor 318 is read by a reading circuit 304 and supplied to a telephone line 301 through an NCU 302, thereby performing transmission of information. Externally transmitted information, on the other hand, is printed on recording paper 315 by an ink jet or thermal head 312 controlled by a printer control circuit 311. The system also includes a paper-feed roller 313 for feeding the recording paper and a roller 314 for holding the recording paper at a printing position.

The mechanical arrangement is under the control of a sensor 306 and a mechanism control circuit 309, and the operating condition is displayed on a display unit 316.

Power is supplied from a power circuit 310 to the individual circuits of the apparatus.

The second and third aspects of the present invention will be described below by way of their practical examples.

A circuit to be described below is preferably applied to a shift register as described above.

(2nd Embodiment)

The second embodiment of the present invention will be described in detail below with reference to the accompanying drawings.

Figure 3:
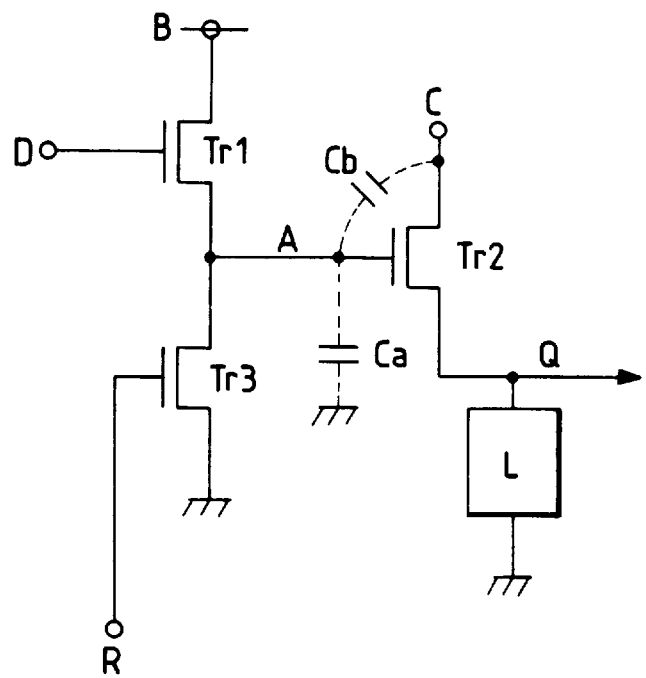
FIG. 3 is a circuit diagram showing a conventional buffer circuit.
Figure 16:
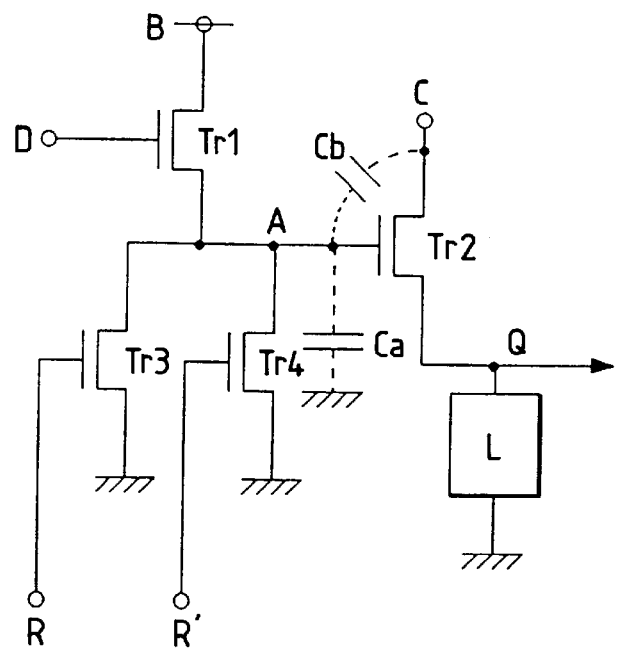
FIG. 16 is a circuit diagram showing a buffer circuit according to the second embodiment of the present invention.

FIG. 16 shows a buffer circuit according to the second embodiment, in which the same reference numerals as in FIG. 3 denote the same parts.

MISTs Tr1, Tr2, and Tr3 are connected in the same manner as in the conventional example, and a sync pulse is similarly applied to a terminal C. In this embodiment, however, a fourth MIST Tr4 is additionally provided such that its first electrode is connected to a node A, its second electrode is connected to the ground, and its gate electrode is connected to a reset terminal R'.

Figure 17:
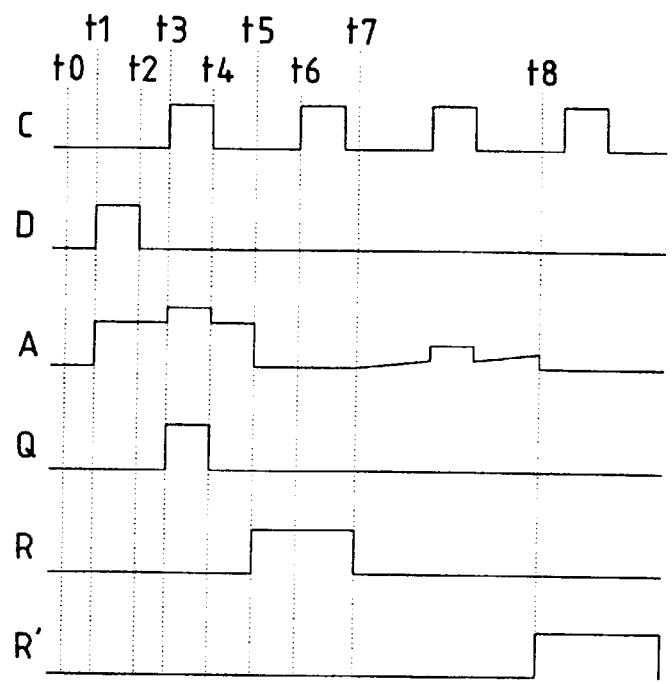
FIG. 17 is a timing chart for explaining the operation of the circuit shown in FIG. 16.

The operation of this circuit will be described with reference to a timing chart shown in FIG. 17. As in the conventional example, the following description will be made by taking an n-channel MIST as an example and using a positive logic. However, exactly the same description can be made for a p-channel MIST by inverting the polarity of a voltage.

Suppose at time t0, an input terminal D, reset terminals R and R', an output terminal Q, a sync pulse terminal C, and the node A are in state "0".

When the input terminal D changes to "1" at time t1, the MIST Tr1 is turned on to charge capacitances Ca and Cb connected to the node A, and the potential at a node C rises. At this time, since the first and second electrodes of the MIST Tr2, i.e., the terminal C and the output terminal Q remain in state "0", the MIST Tr2 does not operate.

When the input terminal D changes to "0" at time t2, the MIST Tr1 is turned off, but the potential at the node A is kept at "1".

When a sync pulse is applied to the terminal C to raise the terminal C to "1" at time t3, the MIST Tr2 is turned on because a potential difference is produced between the first and second electrodes of the MIST Tr2 and the node A as the gate electrode is in state "1", and this raises the output terminal Q to "1". In this case, since the sync pulse is superposed on the potential at the node A by a bootstrap effect obtained by the capacitance Cb, the potential at the node A is increased to have a value higher than that held at the time t2, and this makes it possible to raise the node A up to the power source voltage or higher. Therefore, "1" obtained at the output terminal Q can be a high voltage equal to the voltage of the sync pulse regardless of the threshold voltage of the MIST Tr2.

When the sync pulse goes to "0" at time t4, the MIST Tr2 is turned on in a direction opposite to that at the time t3 because the output terminal Q and the node A as the gate electrode remain in state "1". As a result, a current flows from the output terminal Q to the terminal C, thereby performing a reset operation of lowering the output terminal Q to "0".

When a reset pulse is applied to the reset terminal R at time t5, the MIST Tr3 is turned on to reset the potential at the node A to the ground potential, "0". This reset operation prevents turning on of the MIST Tr2 even when the sync pulse rises to "1" at time t6. The MIST Tr2 operates only when the input terminal D rises to "1" and in this manner functions as a buffer circuit.

At time t7, the reset pulse applied to the reset terminal R is switched from "1" to "0", thereby turning off the MIST Tr3. As a result, the node A floats and is therefore influenced more easily by a leakage current from the MIST Tr1 or external noise. FIG. 17 shows a manner in which the potential at the node A is raised by a leakage current. To prevent a malfunction of the MIST Tr2 caused by this potential rise, a reset signal is applied to the reset terminal R' at time t8 before the potential at the node A exceeds the threshold voltage of the MIST Tr2. As a result, the second reset MIST Tr4 is turned on to reset the potential at the node A again to the ground potential.

As described above, a malfunction of the MIST Tr2 can be prevented by the reset operation of the second reset MIST Tr4. In this case, the ON duties of the reset MISTs Tr3 and Tr4 are decreased to be lower than that of the MIST Tr3 in the conventional example, and the shift amount of the threshold voltage of the MIST is also decreased. This makes it possible to prolong an operation time before a malfunction is caused by an unsatisfactory reset operation. In this manner, a highly reliable circuit can be provided without largely changing the conventional circuit.

Note that the two reset MISTs are provided in the above embodiment, but the present invention is not limited to this embodiment. That is, the number of MISTs can be arbitrarily set in accordance with the relationship between the instability of the node A (caused by, e.g., the magnitude of a leakage current of the MIST Tr1, the magnitude or frequency of external noise, or the like) and the shift amount of the threshold voltage upon turning on of the reset MIST.

(3rd Embodiment)

Figure 18:
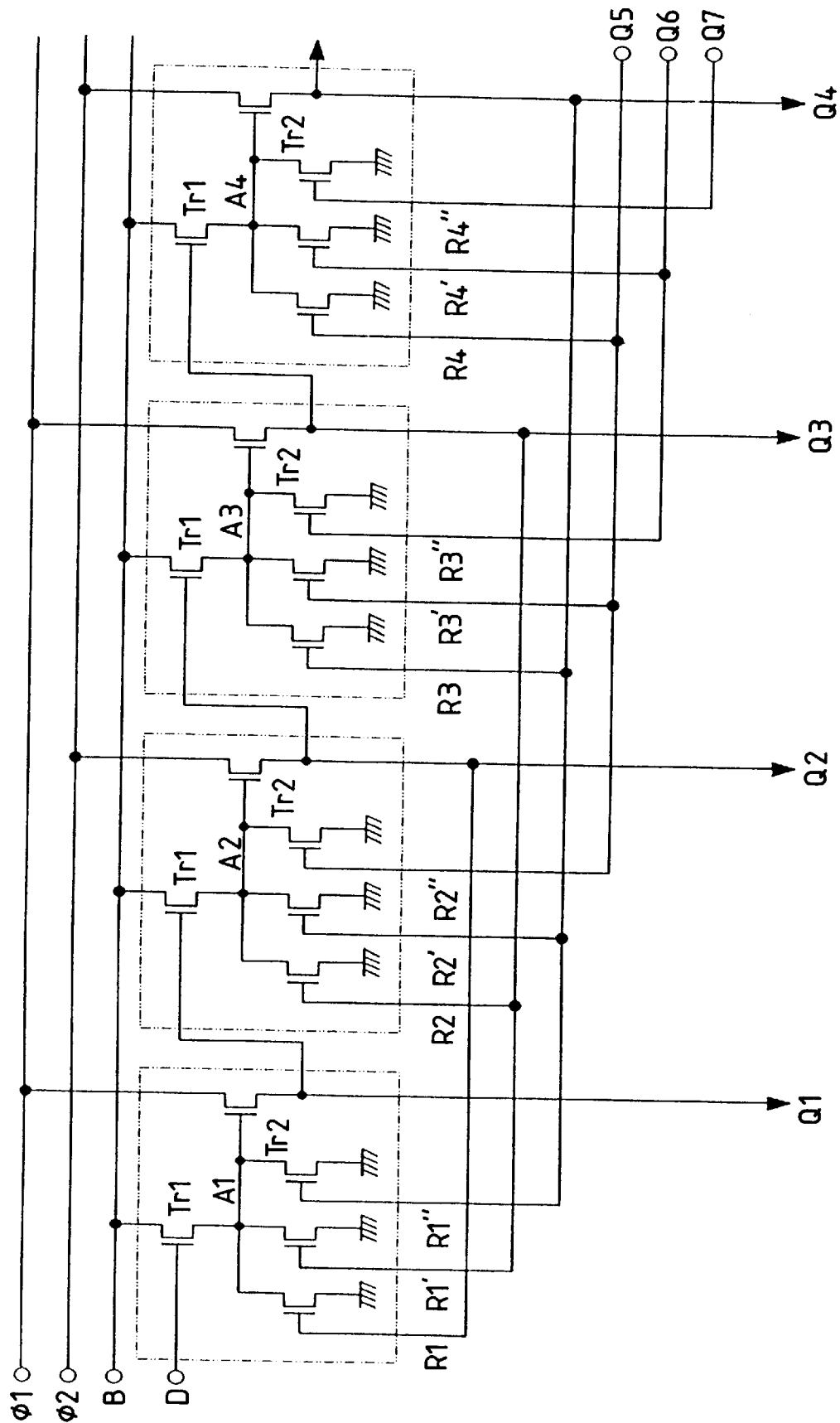
FIG. 18 is a circuit diagram showing a scan pulse generator according to the third embodiment of the present invention.

FIG. 18 shows a scan pulse generator in which the above buffer circuit is used as a basic circuit, and the output terminal of one basic circuit is cascade-connected to the input terminal of the next basic circuit. Referring to FIG. 18, portions surrounded by broken lines indicate the basic buffer circuits each having three reset terminals R, R', and R", and the first four cascade-connected stages are illustrated. The three reset terminals of each buffer circuit are connected to the output terminals of the first, second, and third subsequent stages. This scan pulse generator is applied with sync pulses $\phi_1$ and $\phi_2$ of different phases and has an input pulse terminal D. Each of nodes A1 to A4 of the respective stages corresponds to the node A of the basic circuit for convenience. These buffer circuits also have output terminals Q1 to Q4 and reset terminals R1 to R4, R1' to R4', and R1" to R4".

The operation of the circuit shown in FIG. 18 will be described below with reference to a timing chart shown in FIG. 19.

Assume that each terminal is in state "0" at time t0.

When the input terminal D changes to "1" upon application of an input pulse at time t1, the first basic circuit operates in the same manner as described in the first embodiment.

When the input terminal D changes to "0" at time t2, a MIST Tr1 is turned off, but the potential at the node A1 is kept at "1".

At time t3, an output signal Q1 synchronized with the leading edge of the sync pulse $\phi_1$ is obtained. This output signal Q1 turns on a MIST Tr1 in the second stage, and the node A2 changes to "1".

When the sync pulse $\phi_2$ rises to "1" at time t4 because the node A2 is in state "1", an output signal Q2 synchronized with the sync pulse $\phi_2$ is output as in the first stage. At the same time, since the sync pulse $\phi_1$ falls at the time t4, the output signal Q1 is reset. The output signal Q2 is applied as an input signal to the third stage to raise the node A3 to "1". Since the output signal Q2 also serves as a reset signal R1 of the first stage, the node A1 of the first stage is reset at the time t4 at which the output signal Q2 rises.

Since the sync pulse $\phi_2$ falls at time t5, the output signal Q2 is reset. As a result, the reset signal R1 of the first stage also falls. The sync pulse $\phi_1$ rises again, and the output signal Q3 goes to "1" because the node A3 is in state "1". In this case, since the node A1 is already reset to "0", the output signal Q1 does not rise to "1". Since the output signal Q3 serves as a reset signal R1' of the first stage, the node A1 of the first stage is reset at the time t5 at which the output signal Q3 rises.

In the same manner as described above, output signals Q4, Q5, . . . , synchronized with the sync pulses $\phi_1$ and $\phi_2$ are obtained. In this case, each basic circuit is reset by the internal MISTs by using three signals at the reset terminals R, R', and R" in sequence. With this simple arrangement constituted by a plurality of reset terminals and a plurality of reset MISTs, a malfunction caused by a shift in threshold voltage of the MIST can be prevented. Note that the reset signals are applied to each stage successively from the first, second, and third subsequent stages in the circuit shown in FIG. 19, but a plurality of reset signals can be arbitrarily applied from the subsequent stages.

(4th Embodiment)

Figure 20:
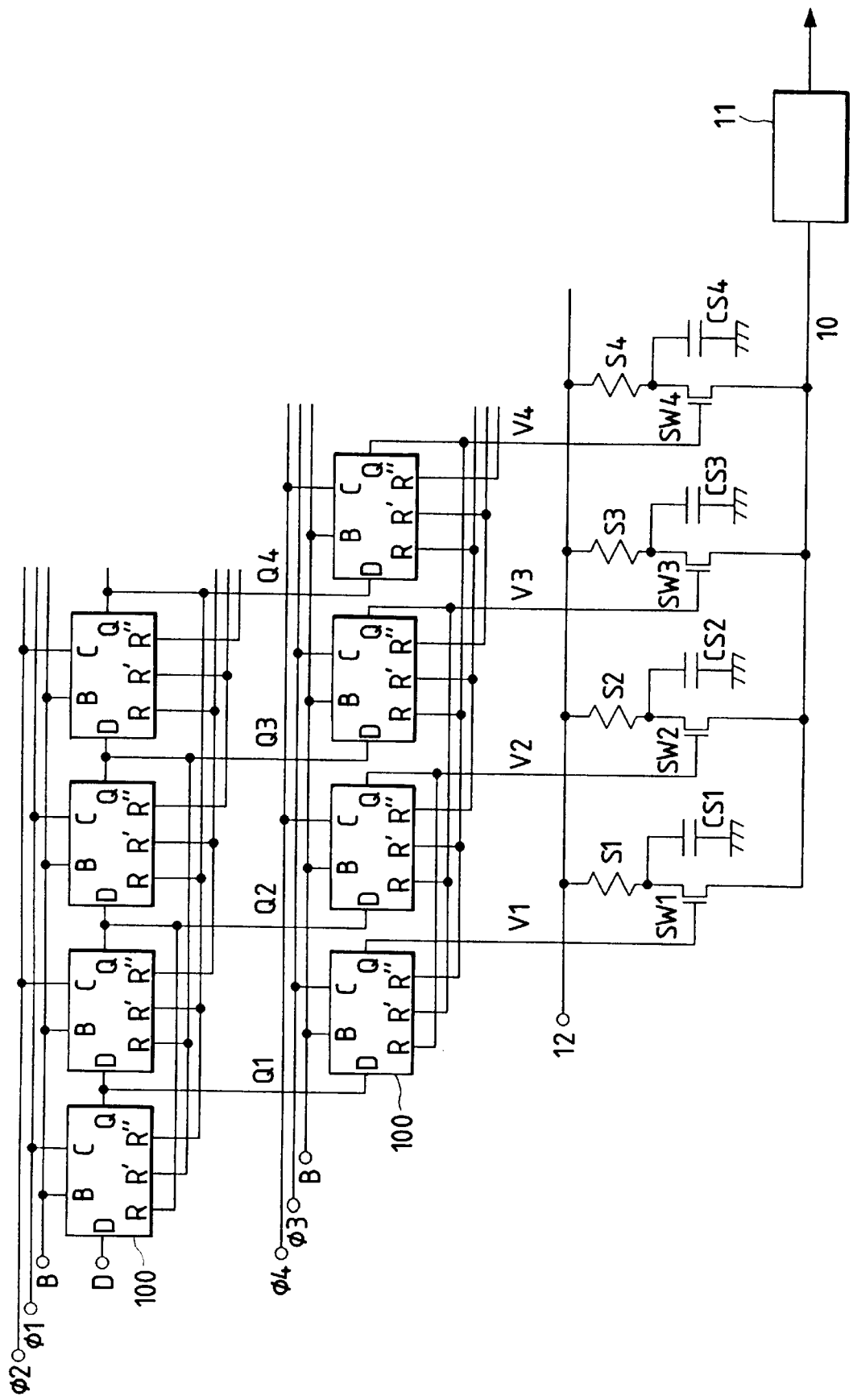
FIG. 20 is a circuit diagram showing a driver of a photoelectric converting element using a scan pulse generator according to the fourth embodiment of the present invention.

FIG. 20 shows the scan pulse generator shown in FIG. 18 and a circuit for amplifying the output from this pulse generator by using the basic buffer circuit described above, thereby driving signal read MISTs SW1 to SW4 of photoelectric converting elements.

A buffer circuit 100 serving as the above basic circuit has the same inner arrangement as shown in FIG. 18.

This circuit is applied with sync pulses $\phi_1$ and $\phi_2$ of different phases and sync pulses $\phi_3$ and $\phi_4$ of different phases for buffer circuits and has an input pulse terminal D and a power terminal B.

Output terminals Q1 to Q4 of the pulse generator are connected to the input terminals of the buffer circuits, and output terminals V1 to V4 of the buffer circuits are connected to the gate electrodes of the read MISTs and the reset terminals of the respective preceding buffer circuits. The first electrodes of the read MISTs SW1 to SW4 are connected to the first electrodes of photoelectric converting elements S1 to S4, and their second electrodes are connected to a common signal line 10. The common signal line 10 is connected to a signal detector 11 for detecting signals read out by the read MISTs. The second electrodes of the photoelectric converting elements S1 to S4 are connected together to a power line 12. Storage capacitors CS1 to CS4 are connected between the first electrodes of the photoelectric converting elements S1 to S4 and the ground.

Figure 19:
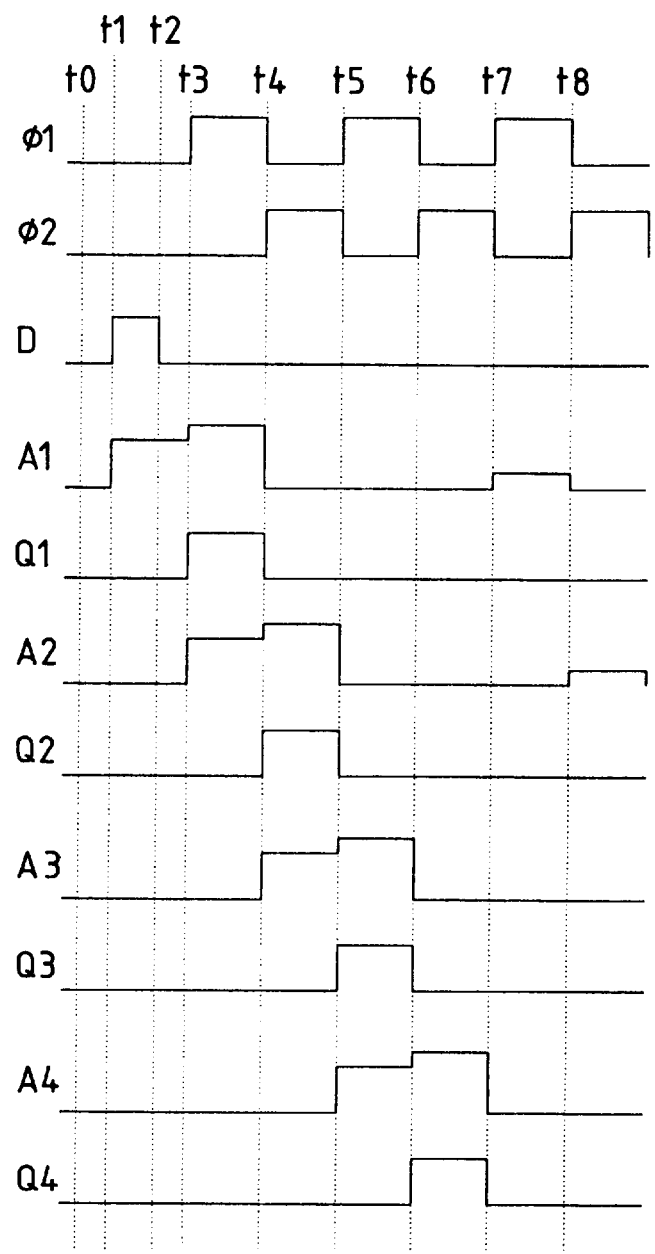
FIG. 19 is a timing chart for explaining the operation of the circuit shown in FIG. 18.
Figure 21:
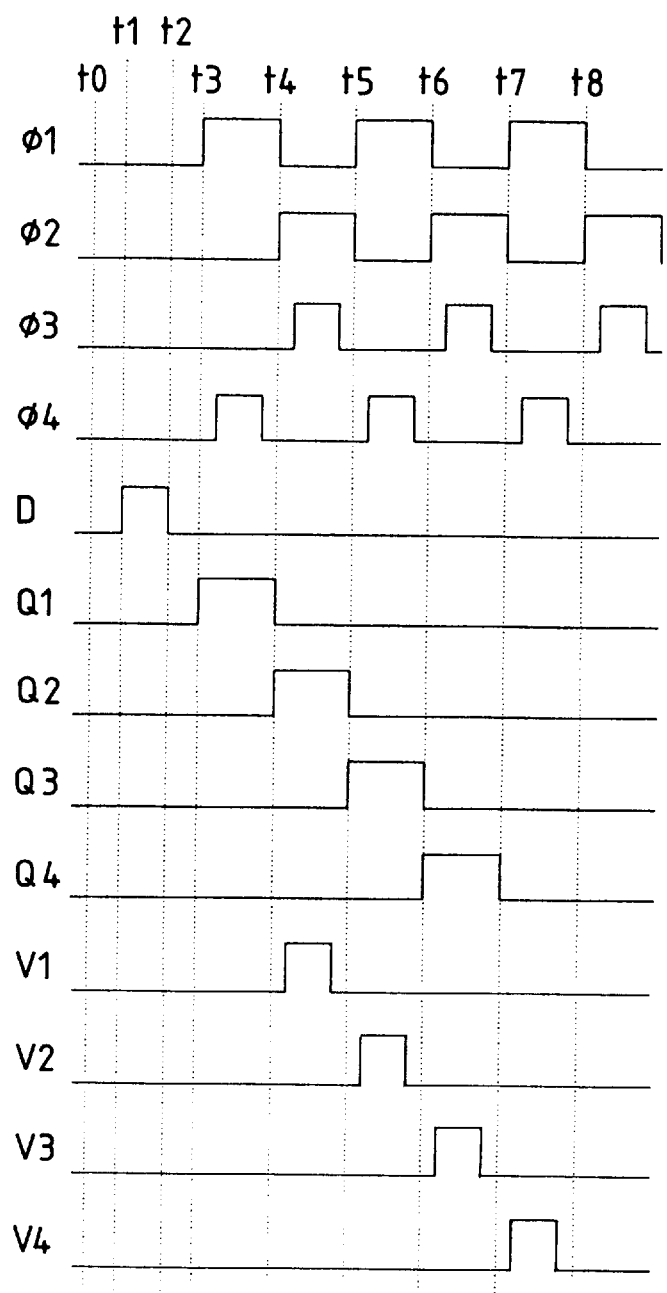
FIG. 21 is a timing chart for explaining the operation of the circuit shown in FIG. 20.

The operation of the pulse generator unit of the photoelectric converting apparatus having the above arrangement is performed in exactly the same manner as indicated by the timing chart shown in FIG. 19. The operation of the buffer unit for amplifying the outputs Q1 to Q4 from the pulse generator unit is the same as the operation of the pulse generator except that the sync pulses $\phi_1$ and $\phi_2$ are replaced with the sync pulses $\phi_3$ and $\phi_4$, and a detailed description thereof will be omitted. A timing chart of this operation is shown in FIG. 21. In this case, the reset operation for the buffer circuit is performed three times, and this prevents a malfunction of the buffer circuit more reliably.

The read MISTs SW1 to SW4 are driven in sequence by the scan pulses obtained as described above, thereby reading out signal charges of the photoelectric converting elements S1 to S4 stored in the storage capacitors CS1 to CS4 to a signal detector 11 through the common signal line 10.

(5th Embodiment)

In the conventional buffer circuit shown in FIG. 3, whether the output terminal Q goes to "0" or "1" when the sync pulse rises to "1" is determined in accordance with whether the potential at the node A is in state "0" or "1". Therefore, a malfunction can be prevented almost completely by stably resetting the potential at the node A as shown in FIG. 16. However, to obtain a further reliable operation, it is desirable to reset the output terminal Q also.

Figure 22:
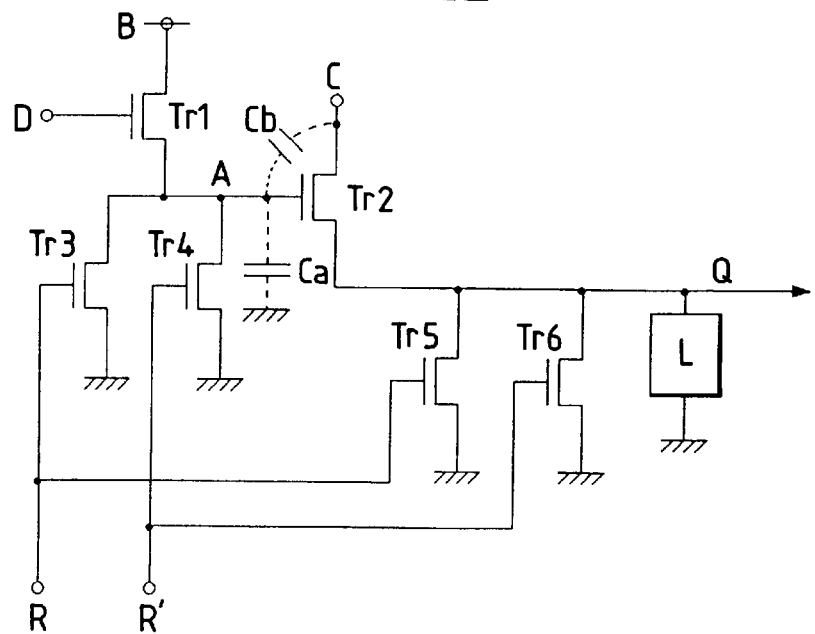
FIG. 22 is a circuit diagram showing a buffer circuit according to the fifth embodiment of the present invention.

FIG. 22 shows still another embodiment of the present invention, in which reset MISTs Tr5 and Tr6 are additionally provided for an output terminal Q in order to further improve the reliability of a buffer circuit according to the embodiment shown in FIG. 16.

The first electrodes of the MISTs Tr5 and Tr6 are connected to the output terminal Q, their second electrodes are connected to a power source voltage (in this case, the ground), and their gate electrodes are connected to reset terminals R and R' to which the gate electrodes of MISTs Tr3 and Tr4 are connected.

The operation of the circuit of FIG. 22 is almost the same as the circuit shown in FIG. 16. At the same time the reset MISTs Tr3 and Tr4 are turned on to reset the node A, the MISTs Tr5 and Tr6 are also turned on to reset the output terminal Q. As a result, the output terminal Q is reset to "0" by the reset MISTs Tr5 and Tr6 when reset signals are applied to the reset terminals R and R', and this achieves a very stable operation.

Since a plurality of reset MISTs are provided for the output terminal Q to perform a reset operation using reset signals having different timings, the ON duty of each reset MIST can be reduced, and this improves the reliability of the circuit as described above.

Figure 5:
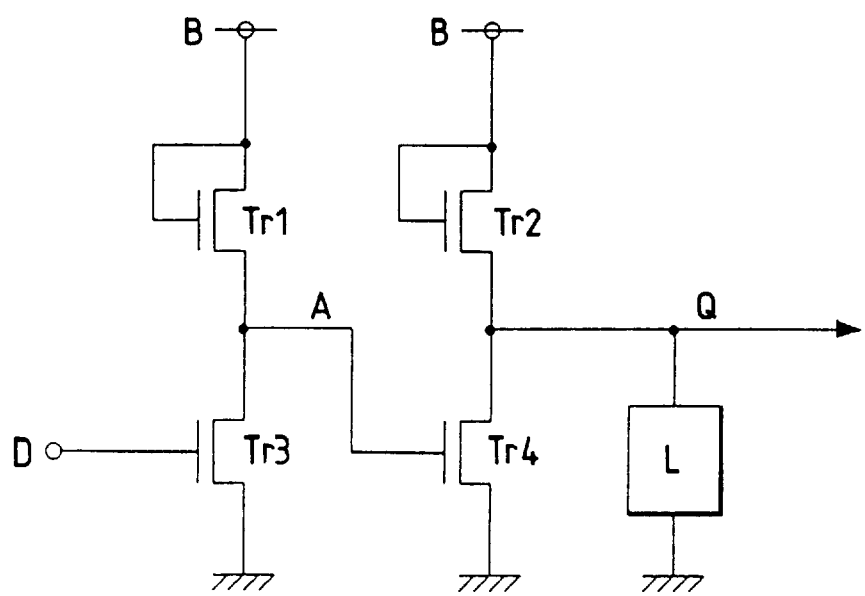
FIG. 5 is a circuit diagram showing a conventional buffer circuit.
Figure 6:
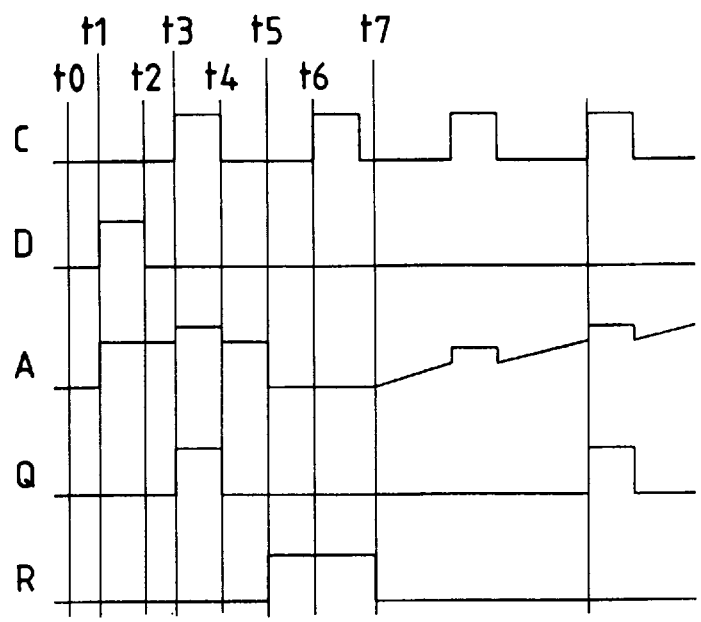
FIG. 6 is a timing chart for explaining a malfunction of the conventional buffer circuit shown in FIG. 3.
Figure 7:
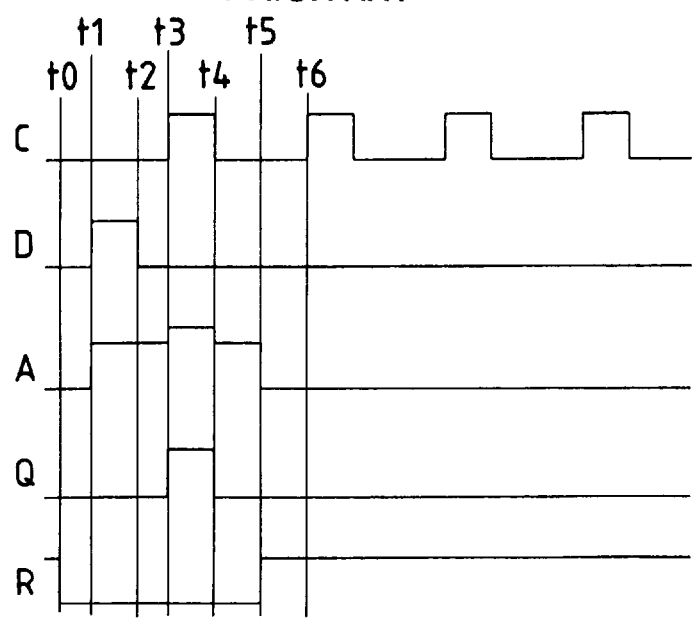
FIG. 7 is a timing chart for explaining the operation of the conventional buffer circuit shown in FIG. 3.
Figure 8:
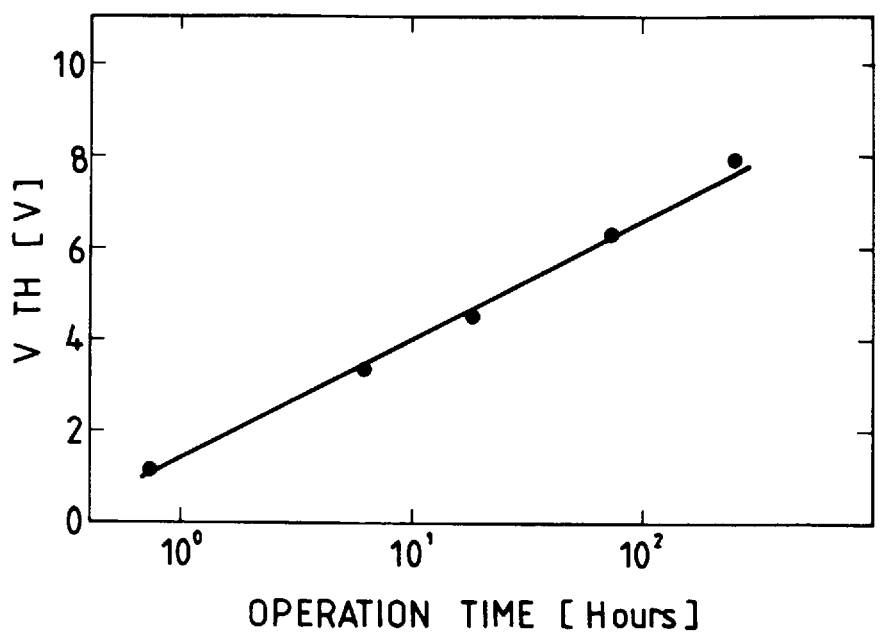
FIG. 8 is a graph showing the change in threshold voltage as a function of the gate voltage application time.

In addition, the scan pulse generator and the buffer for amplifying the output from the generator shown in FIGS. 3 and 5 can be constituted by using the buffer circuit in which the reset MISTs are also connected to the output terminal Q as shown in FIG. 22 as a basic circuit. In the above embodiment, the first electrode of the first MIST of the basic circuit is connected to the power source. However, the same operation can be obtained by connecting the first electrode to the input terminal D to receive the same signal as the gate electrode.

(6th Embodiment)

Figure 23A:
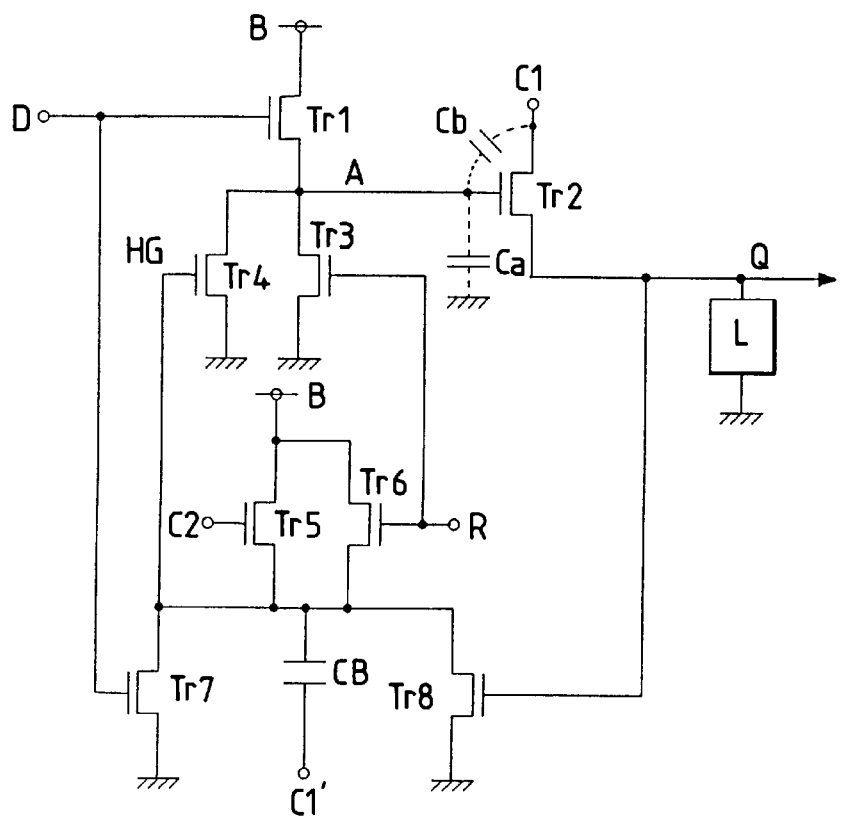
FIGS. 23A and 23B are circuit diagrams showing buffer circuits according to the sixth embodiment of the present invention.
Figure 23B:
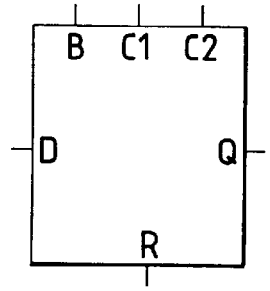

FIG. 23 shows a buffer circuit according to the sixth embodiment of the present invention, in which the same reference numerals as in FIG. 3 denote the same parts.

MISTs Tr1, Tr2, and Tr3 are connected in the same manner as the conventional example, and terminals C1 and C1' are applied with sync pulses as the terminal C shown in FIG. 3. In this embodiment, however, fourth to eighth MISTs Tr4 to Tr8 and a capacitor CB are additionally provided such that the first electrode of the fourth MIST Tr4 is connected to a node A, its second electrode is connected to the ground, and its gate electrode is connected to the first electrodes of the fifth, sixth, seventh, and eighth MISTs Tr5, Tr6, Tr7, and Tr8. This node will be referred to as a node HG hereinafter for convenience. The second electrodes of the fifth and sixth MISTs Tr5 and Tr6 are commonly connected to a power source B, and the second electrodes of the seventh and eighth MISTs Tr7 and Tr8 are connected to the ground. A sync pulse having a phase opposite to those of sync pulses applied to the terminals C1 and C1' is applied to a terminal C2 connected to the gate electrode of the fifth MIST Tr5. The gate electrode of the sixth MIST Tr6 is connected to a reset terminal R. The gate electrode of the seventh MIST Tr7 is connected to an input terminal D, and the gate electrode of the eighth MIST Tr8 is connected to an output terminal Q. The first electrode of the capacitor CB is connected to the node HG, and its second electrode is connected to the terminal C1' and is applied with the same pulse as applied to the second electrode of the second MIST Tr2.

Figure 24:
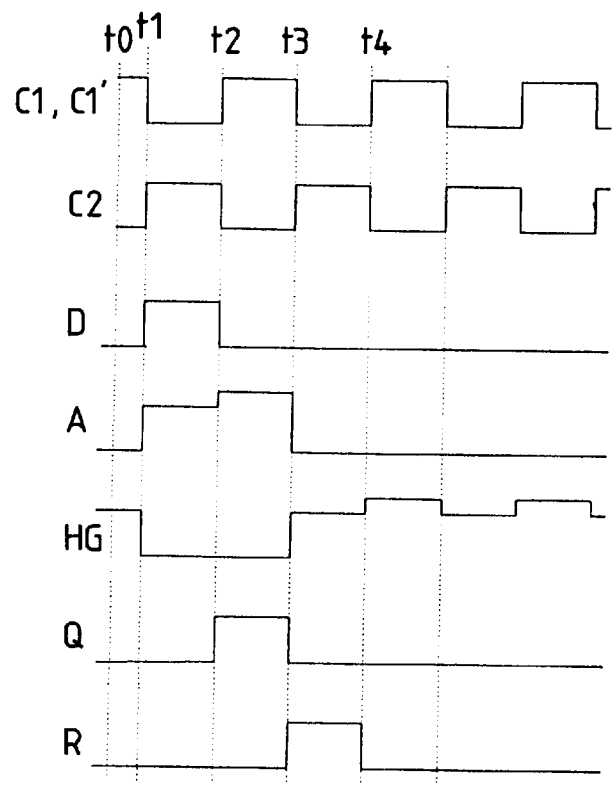
FIG. 24 is a timing chart for explaining the operation of the circuit shown in FIG. 23.

The operation of this circuit will be described below with reference to a timing chart shown in FIG. 24. Like the conventional example, the following description will be made by taking an n-channel MIST as an example and using a positive logic. However, exactly the same description can be made for a p-channel MIST by inverting the polarity of a voltage.

Assume that at time t0, the input terminal D, the reset terminal R, the output terminal Q, and the sync pulse terminal C2 are in state "0" and the sync pulse terminals C1 and C1' and the node HG are in state "1". In this condition, the node A is reset to "0"' because the MIST Tr4 is ON.

At time t1, the sync pulse terminal C1 changes from "1" to "0", and the sync pulse terminal C2 changes from "0" to "1". At the same time, the input terminal D changes to "1". As a result, the MIST Tr7 is turned on, and the node HG is discharged through the MIST Tr7 and reliably reset to "0". Therefore, the MIST Tr4 is switched from ON to OFF to set the node A in a floating state. In addition, the MIST Tr1 is turned on because the input terminal D rises to "1", so the node A in the floating state is charged to "1" by the power source connected to the terminal B. In this case, since the first and second electrodes of the MIST Tr2, i.e., the terminal C1 and the output terminal Q are in state "0", the MIST Tr2 does not operate.

At time t2, the sync pulse terminal C1 changes from "0" to "1", and the sync pulse terminal C2 changes from "1" to "0". When the sync pulse terminal C1 rises to "1", the MIST Tr2 is turned on because a potential difference is produced between the first and second electrodes of the MIST Tr2 and the node A as the gate electrode is in state "1", and this raises the output terminal Q to "1". In this case, since the sync pulse is superposed on the potential at the node A by a bootstrap effect obtained by the capacitor CB, the potential at the node A is increased to have a higher value than that held at the time t2, and this makes it possible to raise the node A up to the power source voltage or higher. Therefore, the state "1" obtained at the output terminal Q can be a high voltage equal to the voltage of the sync pulse regardless of the threshold voltage of the MIST Tr2. Since the MIST Tr8 is turned on when the output terminal Q rises to "1", the node HG remains at "0" even if the input terminal D changes to "0" to turn off the MIST Tr7. As a result, the potential at the node A can be held at "1" even when the input terminal D changes to "0" to turn off the MIST Tr1.

At time t3, the sync pulse terminal C1 changes from "1" to "0", and the sync pulse terminal C2 changes from "0" to "1". When the sync pulse terminal C1 goes to "0", the MIST Tr2 is turned on in a direction opposite to that at the time t2 because the output terminal Q and the node A as the gate electrode remain at "1". As a result, a current flows from the output terminal Q to the terminal C1, thereby performing a reset operation of lowering the output terminal Q to "0". Therefore, the MIST Tr8 is turned off, the MIST Tr5 is turned on, the node HG is raised to "1", and the MIST Tr4 is turned on. As a result, the node A can be reset to "0" more stably.

At time t4, the sync pulse terminal C1 changes from "0" to "1", and the sync pulse terminal C2 changes from "1" to "0". In this case, the MIST Tr5 is turned off, and the node HG is floated and kept at "1". However, the sync pulse terminal C1' rises from "0" to "1", and this rise sets the node HG in state "1" higher than the power source voltage through the capacitor CB. As a result, a voltage higher than the power source voltage is applied to the gate electrode of the reset MIST Tr4. Since the potential at the node A is reset to "0", the MIST Tr2 is not turned on. The MIST Tr2 operates only when the input terminal D rises to "1" and in this manner functions as a buffer circuit.

In this embodiment as described above, the voltage higher than the power source voltage is generated at the node HG by the bootstrap effect obtained via the capacitor CB, and this allows the reset MIST Tr4 to perform a reset operation. In this case, since the gate voltage of the reset MIST Tr4 can be easily raised to be higher than the gate voltage applied to the MIST Tr3 of the conventional example shown in FIG. 3, a reliable reset operation can be performed even if the threshold voltage of the MIST is shifted. This makes it possible to prolong an operation time before a malfunction is caused by an unsatisfactory reset operation. According to the present invention as described above, a highly reliable circuit can be provided by a single power source voltage.

Note that the MISTs Tr3 and Tr6 having the gate electrodes connected to the reset terminal R can reset the node A and the node HG to "0" and "1", respectively, when an input is applied to the reset terminal R. Therefore, by applying an input to the reset terminal R at an arbitrary timing at which no input is applied to the input terminal D, the MISTs Tr3 and Tr6 can perform an auxiliary reset operation. This function of the MIST Tr3 is exactly the same as the conventional example. In general, as shown in FIG. 24, an input is applied at the timing of the trailing edge of the output terminal Q, thereby assisting reset of the output terminal Q.

An illustration (b) of FIG. 23 symbolizes a circuit (a) in the same drawing.

(7th Embodiment)

Figure 25:
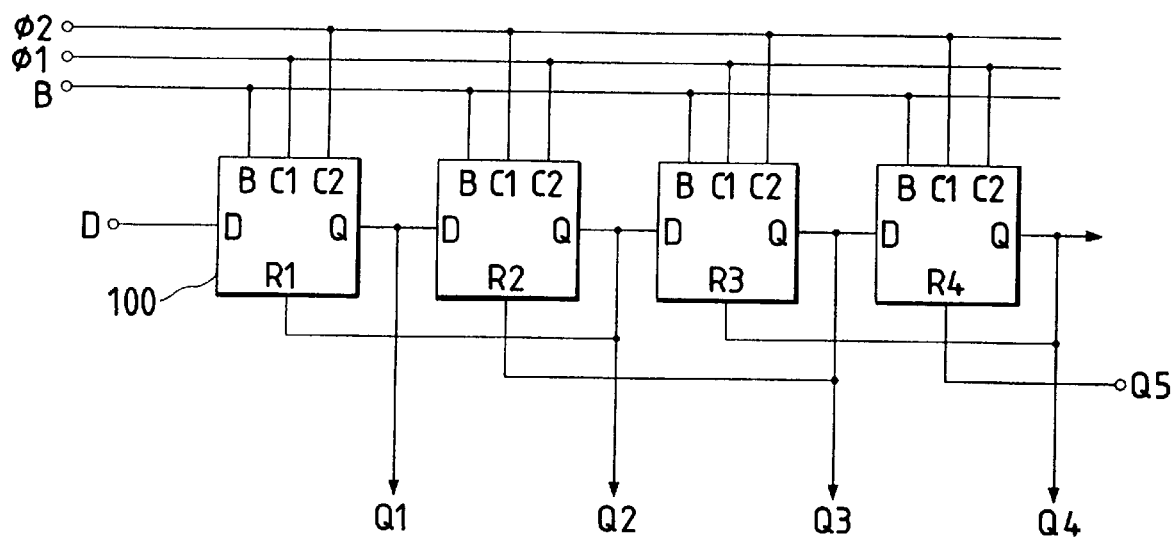
FIG. 25 is a circuit diagram showing a scan pulse generator according to the seventh embodiment of the present invention.

FIG. 25 shows a scan pulse generator in which the buffer circuit described above is used as a basic circuit, and the output terminal of each basic circuit is cascade-connected to the input terminal of a basic circuit in the next stage. Referring to FIG. 25, each block 100 represents the symbolized circuit (b) shown in FIG. 23, and the first four cascade-connected stages are illustrated. Each reset terminal is connected to the output terminal of the subsequent stage. The circuit is applied with sync pulses $\phi_1$ and $\phi_2$ of different phases and has an input pulse terminal D. Nodes of the individual stages corresponding to the node A and the node HG of the basic circuit are represented by A1 to A4 and HG1 to HG4 for convenience. The stages also have output terminals Q1 to Q4 and reset terminals R1 to R4.

Figure 26:
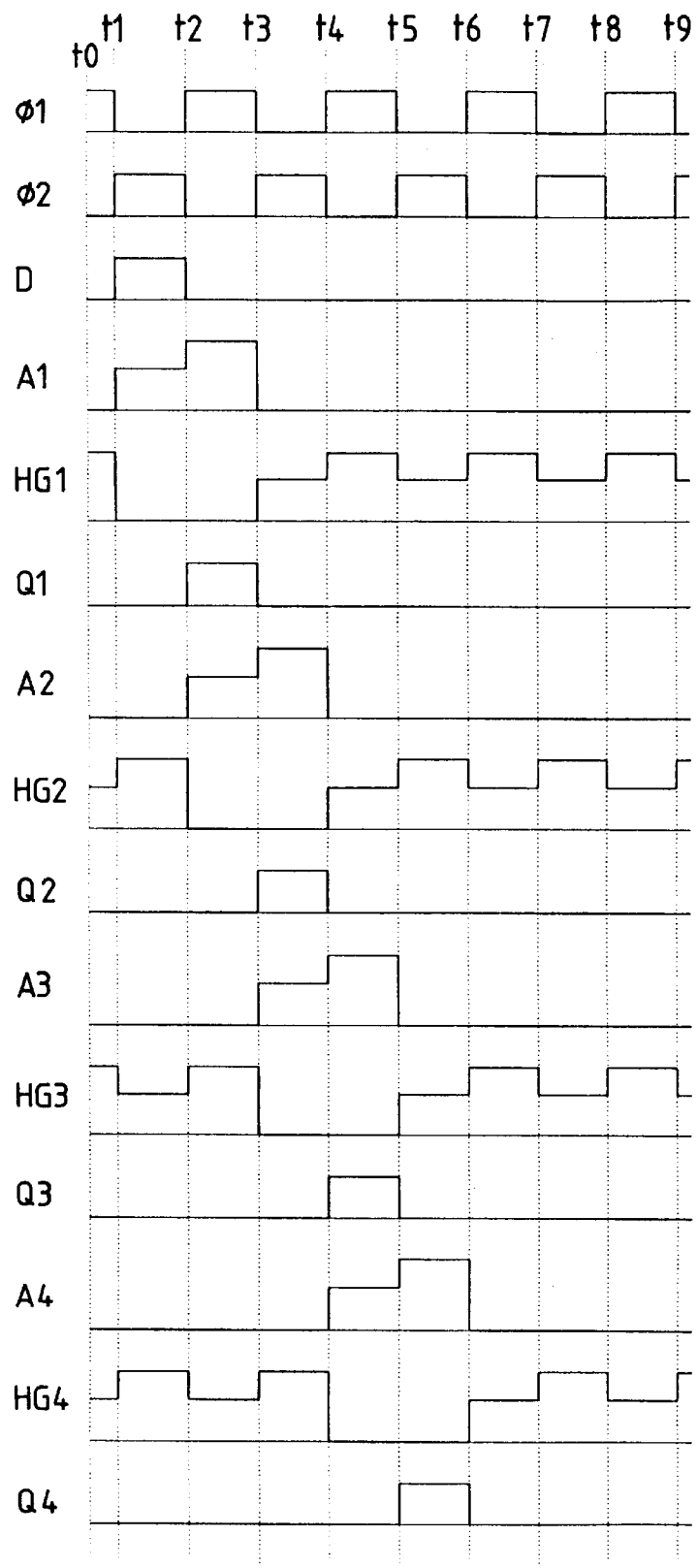
FIG. 26 is a timing chart for explaining the operation of the circuit shown in FIG. 25.

The operation of the circuit shown in FIG. 25 will be described below with reference to a timing chart shown in FIG. 26.

Assume that at time t0, the input terminal D, the output terminals Q1 to Q4, the reset terminals R1 to R4, and the sync pulse $\phi_2$ are in state "0" and the sync pulse $\phi_1$ and the node HG of each stage are in state "1". In this condition, since the MIST Tr4 in each stage is ON, the node A in each stage is reset to "0".

When the input terminal D changes to "1" upon application of an input pulse at time t1, the first basic circuit operates in the same manner as the first embodiment.

At time t2, an output signal Q1 synchronized with the leading edge of the sync pulse $\phi_1$ is obtained. This output signal Q1 turns on a MIST Tr7 in the second stage to put the node HG2 at "0" and at the same time turns on a MIST Tr1 in the second stage to put the node A2 at "1".

Since the node A2 is in state "1" at time t3, an output signal Q2 synchronized with the sync pulse $\phi_2$ is output as in the first stage when the sync pulse $\phi_2$ rises to "1". At the same time, the sync pulse $\phi_1$ falls at the time t3, so a MIST Tr2 in the first stage resets the output signal Q1. In addition, since the output signal Q1 serves as a reset signal R1 for the first stage, the node A1 and the node HG1 in the first stage are reliably reset to "0" and "1", respectively. The output signal Q2 also serves as an input signal for the third stage to put the node A3 at "1".

Since the sync pulse $\phi_2$ falls at time t4, a MIST Tr2 in the second stage resets the output signal Q2. The sync pulse $\phi_1$ rises again and the node A3 is in state "1", so the output signal Q3 goes to "1". In this case, since the node A is already reset to "0", the output signal Q1 is not raised to "1". The output signal Q3 serves as a reset signal R2 for the second stage, so the node A2 and the node HG2 in the second stage are reliably reset to "0" and "1", respectively.

In the same manner as described above, output signals Q4, Q5, . . . , synchronized with the sync pulses $\phi_1$ and $\phi_2$ are obtained.

As described above, a voltage higher than the power source voltage can be generated at the node HG in each stage by the bootstrap effect obtained via the capacitor CB in that stage, and this allows the reset MIST Tr4 in the stage to perform a reset operation. In this case, the gate voltage of the reset MIST Tr4 can be easily raised to be higher than the gate voltage applied to the MIST Tr3 of the conventional example shown in FIG. 3, so a reset operation can be stably performed even if the threshold voltage of the MIST is shifted. This makes it possible to prolong an operation time before a malfunction is caused by an unsatisfactory reset operation. According to the present invention as described above, a highly reliable circuit can be provided by a single power source voltage.

Note that in the circuit shown in FIG. 25, the reset terminal R in each stage receives an output signal from the first subsequent stage. However, a reset signal can be applied from an arbitrary one of the subsequent stages.

(8th Embodiment)

Figure 27:
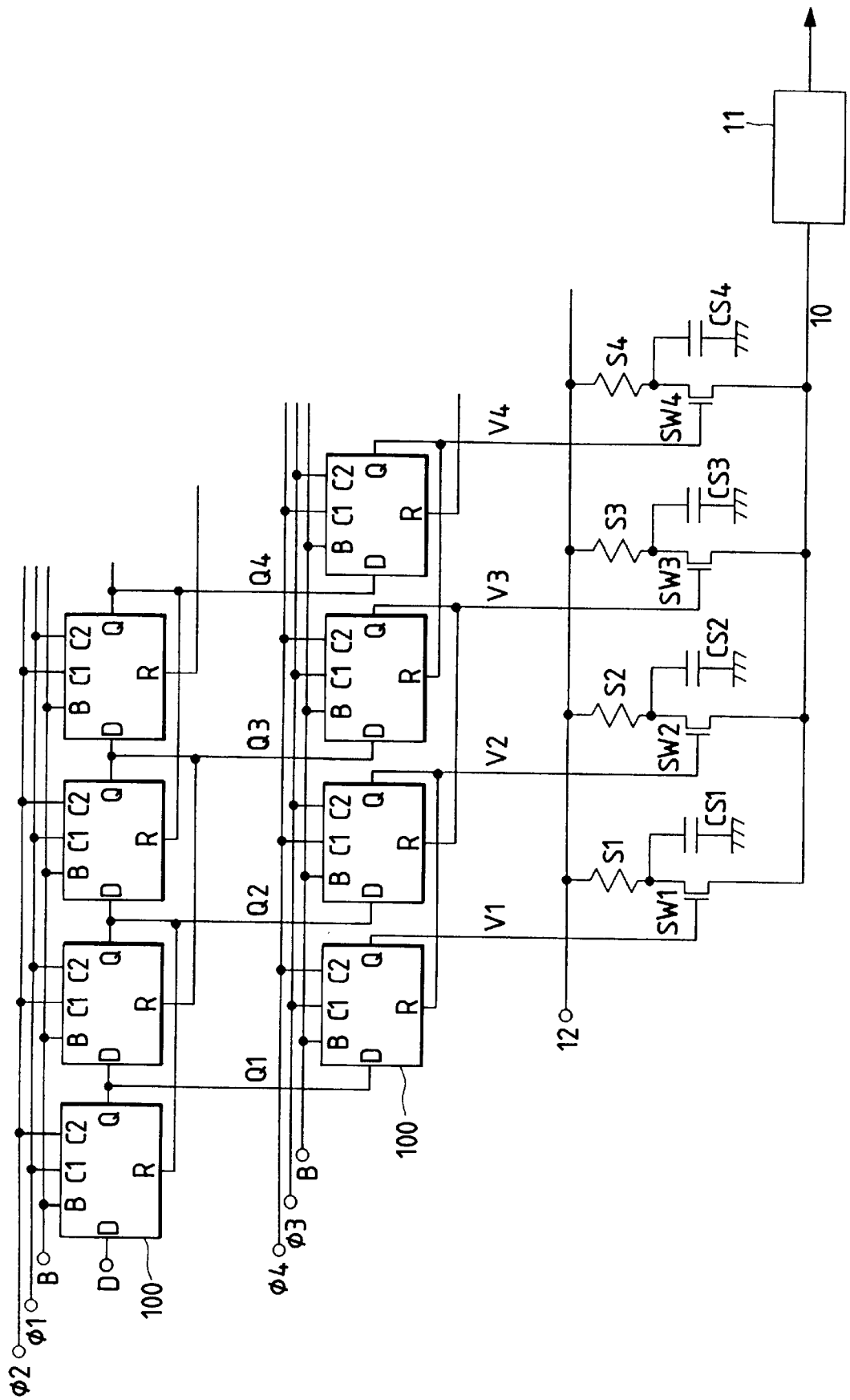
FIG. 27 is a circuit diagram showing a driver of a photoelectric converting element using a scan pulse generator according to the eighth embodiment of the present invention.

FIG. 27 shows the scan pulse generator shown in FIG. 25 and a circuit for amplifying the output from the pulse generator by using the basic buffer circuit described above, thereby driving signal read MISTs SW1 to SW4 of photoelectric converting elements.

A buffer unit 100 as the basic circuit has the same inner arrangement as that shown in FIG. 23.

This circuit is applied with sync pulses $\phi_1$ and $\phi_2$ of different phases and sync pulses $\phi_3$ and $\phi_4$ of different phases for buffer circuits and also includes an input pulse terminal D and a power terminal B.

Output terminals Q1 to Q4 of the pulse generator are connected to the input terminals of buffer circuits, and output terminals V1 to V4 of the buffer circuits are connected to the gate electrodes of the read MISTs and the reset terminals of the respective preceding buffer circuits.

The first electrodes of the read MISTs SW1 to SW4 are connected to the first electrodes of photoelectric converting elements S1 to S4, and their second electrodes are connected to a common signal line 10. The common signal line 10 is connected to a signal detector 11 for detecting signals read out by the read MISTs. The second electrodes of the photoelectric converting elements S1 to S4 are commonly connected to a power line 12. Storage capacitors CS1 to CS4 are connected between the first electrodes of the photoelectric converting elements S1 to S4 and the ground, respectively.

Figure 28:
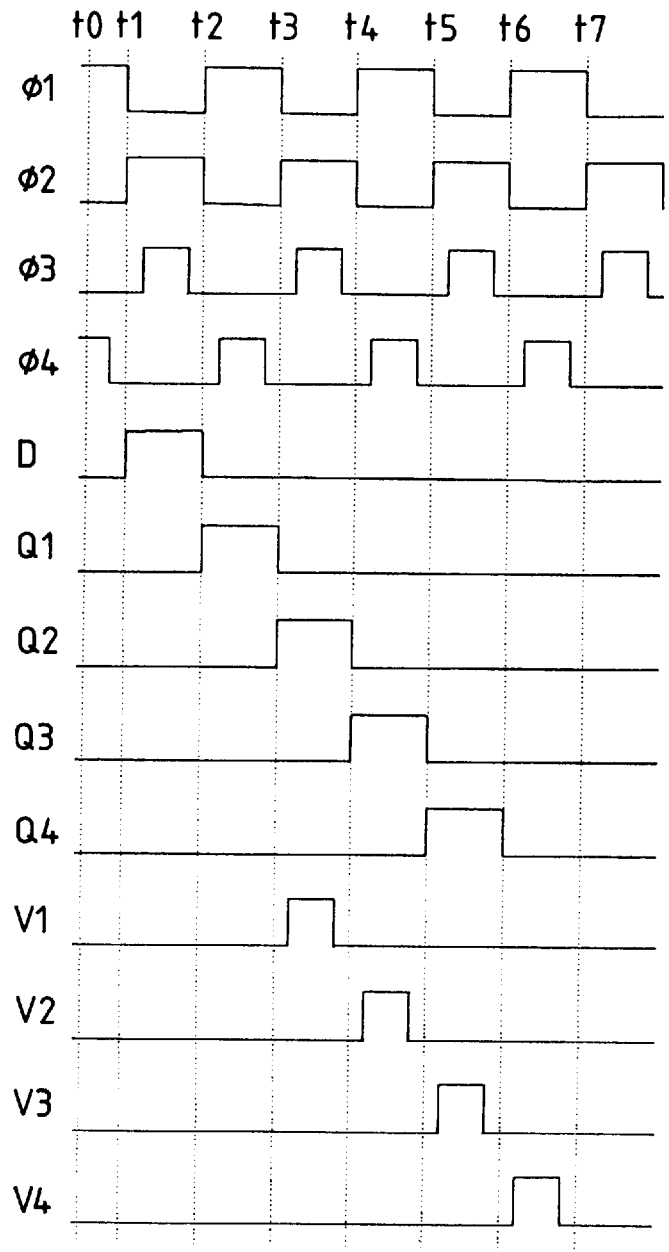
FIG. 28 is a timing chart for explaining the operation of the circuit shown in FIG. 27.

The operation of the pulse generator unit of the photoelectric converting apparatus having the above arrangement is performed in exactly the same manner as that explained with reference to the timing chart shown in FIG. 26. The operation of the buffer unit for amplifying the outputs from the output terminals Q1 to Q4 of the pulse generator unit is also the same as the operation of the pulse generator except that the sync pulses $\phi_1$ and $\phi_2$ are replaced with the sync pulses $\phi_3$ and $\phi_4$, and a detailed description thereof will be omitted. FIG. 28 shows a timing chart for explaining the operation.

Since a voltage higher than the power source voltage is applied to the node HG of each buffer circuit, a reset operation can be reliably performed even if the threshold voltage of the MIST is shifted. For this reason, an operation time before a malfunction is caused by an unsatisfactory reset operation can be prolonged. The read MISTs SW1 to SW4 are driven in sequence by scan pulses thus obtained, and this makes it possible to read out the signal charges of the photoelectric converting elements S1 to S4 stored in the storage capacitors CS1 to CS4 to the signal detector 11 through the common signal line 10.

(9th Embodiment)

In the conventional buffer circuit shown in FIG. 3, whether the output terminal Q goes to "0" or "1" when the sync pulse rises to "1" is determined in accordance with whether the potential at the node A is in state "0" or "1". Therefore, a malfunction can be almost prevented by stably resetting the potential at the node A as shown in FIG. 23. However, to obtain a further reliable operation, it is desirable to reset the output terminal Q also.

Figure 29:
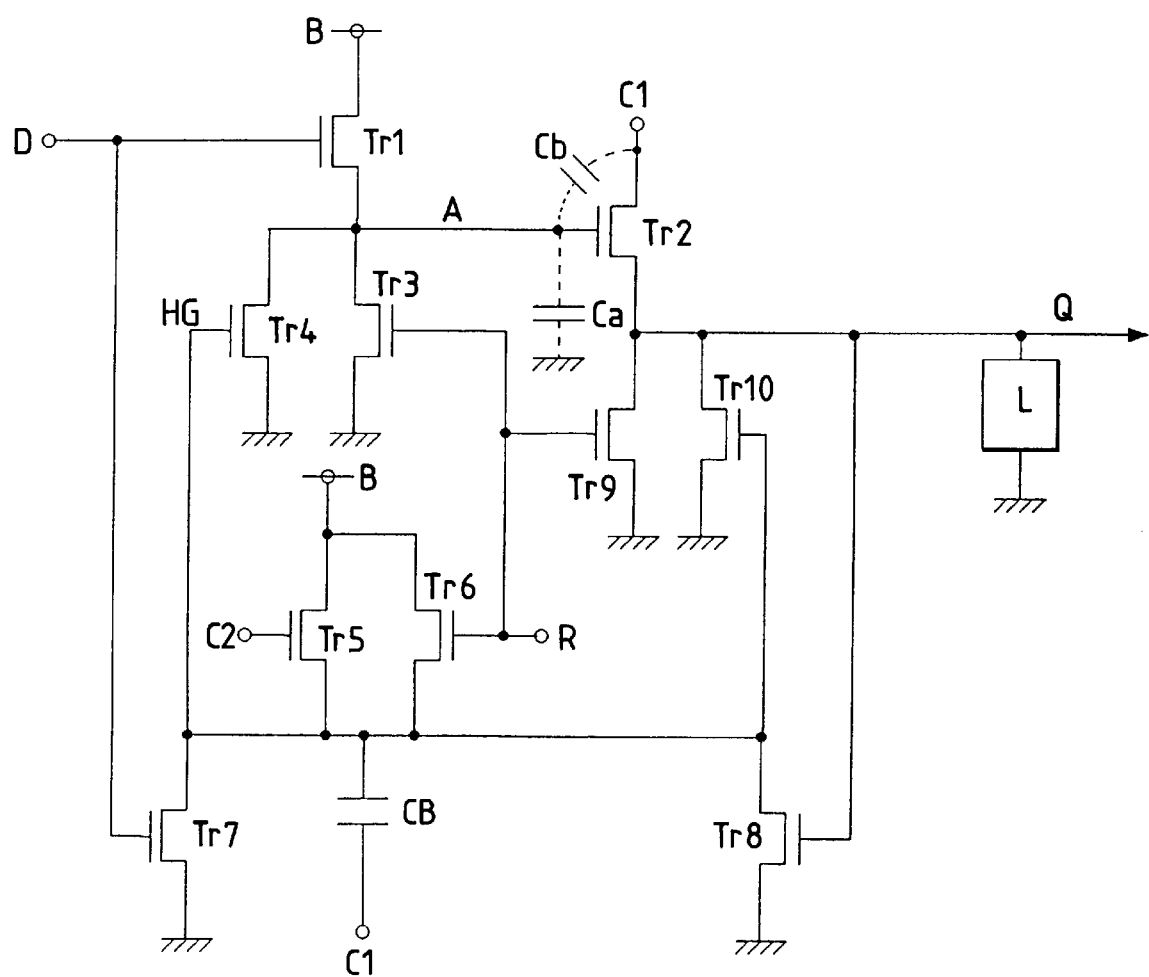
FIG. 29 is a circuit diagram showing a buffer circuit according to the ninth embodiment of the present invention.

FIG. 29 shows still another embodiment of the present invention in which reset MISTs Tr9 and Tr10 are additionally provided for an output terminal Q in order to further improve the reliability of the buffer circuit according to the embodiment shown in FIG. 23.

The first electrodes of the MISTs Tr9 and Tr10 are connected to the output terminal Q, and their second electrodes are connected to a power source voltage (in this case, the ground). The gate electrode of the MIST Tr9 is connected to a reset terminal R, and the gate electrode of the MIST Tr10 is connected to a node HG.

The operation of the circuit shown in FIG. 29 is almost the same as the circuit shown in FIG. 16. In this circuit, however, when a reset MIST Tr3 is turned on to reset a node A upon application of a reset signal to the reset terminal R, the MIST Tr9 is simultaneously turned on to reset the output terminal Q. In addition, when the node HG is in state "1", a MIST Tr4 is turned on to reset the node A, and at the same time the MIST Tr10 is turned on to reliably reset the output terminal Q. As a result, the output terminal Q is reset by the MIST Tr10 applied with the gate voltage higher than the power source voltage except when the input signal rises to "1", and this attains a very stable operation.

Since a reset operation can be stably performed even if the threshold voltage of the MIST is shifted, an operation time before a malfunction is caused by an unsatisfactory reset operation can be prolonged as described above.

It is also possible to arrange the pulse generator and the buffer for amplifying the output from the pulse generator shown in FIGS. 25 and 27 by using the buffer circuit, in which the reset MISTs Tr9 and Tr10 are connected to the output terminal Q as shown in FIG. 29, as a basic circuit.

In the above embodiment, the first electrode of the first MIST of the basic circuit is connected to the power source. However, exactly the same operation can be obtained by connecting the first electrode not to the power source but to the input terminal D, thereby receiving the same signal as the gate electrode.

According to the present invention as has been described above, switching elements are grouped in units of N elements having a common control line, and a shift register for scanning the control lines is constituted by thin-film transistors. Therefore, an inexpensive electronic circuit apparatus can be provided without decreasing an essential scan rate.

According to another aspect of the present invention, a plurality of reset transistors are provided in a buffer circuit, so the ON duty of each reset transistor can be reduced compared to that in conventional examples, and this makes it possible to reduce the shift amount in threshold voltage of the transistor. Therefore, an operation time before a malfunction is caused by an unsatisfactory reset operation can be prolonged. As a result, a highly reliable circuit can be provided without largely changing the conventional circuit configuration.

According to still another aspect of the present invention, a sync pulse is applied to one terminal of a capacitive element to generate a voltage higher than the power source voltage by a bootstrap effect, and this voltage is applied to the gate electrode of a reset transistor. Therefore, since a reduction in ON current can be essentially suppressed even if the threshold voltage is shifted, a reset operation can be reliably performed. This makes it possible to prolong an operation time before a malfunction is caused by an unsatisfactory reset operation. As a result, a highly reliable buffer circuit can be provided with a simple arrangement.

What is claimed is:

1. An electronic circuit apparatus comprising:

an array of m×n photoelectric conversion elements comprising n blocks arranged in a first predetermined direction, each of which comprises m photoelectric conversion elements adjacent to each other in a second predetermined direction;

a power source connected commonly to all of inputs of said array of m×n photoelectric conversion elements;

an array of m×n switching elements, corresponding one-to-one to the each of said functional elements, comprising n blocks each comprising m thin film transistors adjacent to each other, wherein an input of each of said switching elements is connected to a respective output of a corresponding one of said photoelectric conversion elements, and wherein, in each block of said switching elements, gates of said m switching elements are connected commonly, so as to constitute n common control lines;

m common output lines, wherein respective common output lines are connected commonly to an output of one switching element selected from each of n blocks of said switching elements;

a shift register having n outputs, the n outputs of said shift resistor respectively being connected commonly to n common control lines;

a selector connected to the m common output lines, for selecting one from among the common output lines and connecting the selected one to an output terminal, wherein said shift resistor outputs a pulse to the selected common control line, to turn on simultaneously the switching elements in the selected block, so that the photoelectric conversion signal is output through said switching elements to said m common output lines, and said selector operates to output successively the photoelectric conversion signal from the output terminal, wherein the shift register output operation is repeated n times, thereby outputting the photoelectric conversion signal successively from said m×n photoelectric conversion elements through the output terminal, wherein said shift register comprises a thin film transistor, and wherein the selector comprises a transistor having an active region of a monocrystalline semiconductor.

2. An electronic circuit apparatus comprising:

an array of n×m functional elements comprising n blocks arranged in a first predetermined direction, and each comprising m functional elements arranged adjacent to each other in a second predetermined direction;

a power source connected commonly to all of said array of m×n functional elements;

an array of m×n switching elements, corresponding one-to-one to the each of said functional elements, comprising n blocks each comprising m switching elements comprising thin film transistors adjacent to each other, an output of each of said switching elements being connected to a respective output of a corresponding one of said functional elements, and wherein, in each block of said switching elements, gates of said m switching elements of the each block are connected commonly, to constitute n common control lines;

m common lines, wherein respective common lines are connected commonly to the input of one switching element selected from each block of said switching elements;

a shift register having n outputs, the n outputs of said shift register respectively being connected commonly to n common control lines;

a selector connected to m common lines for selecting one from among the common lines to connect the selected common line to a terminal, wherein said selector inputs a signal successively from the terminal into said m common lines to cause a pulse to be output from said shift register to the selected common control line, so that said switching elements in the selected block are simultaneously turned on, thereby causing the signal to be input through said switching elements from the m common lines to said functional elements, wherein the input operation of said selector is repeated n times, to input, from the terminal, the signal successively into said m×n functional elements, wherein said shift register comprises a thin film transistor, and wherein said selector comprises a transistor having an active region of a monocrystalline semiconductor.

3. An apparatus according to claim 2, wherein said functional elements are liquid-crystal elements.

4. An apparatus according to claim 1 or 2, wherein said shift register selector has a terminal to which two clock signals having different phases are applied.

5. An apparatus according to claim 1 or 2, wherein said selector has a multiplexer.

6. An apparatus according to claim 1 or 2, wherein said switching elements and said shift register are formed on a single substrate, and a semiconductor integrated circuit having said selector is formed on said substrate.

7. An apparatus according to claim 1 or 2, further comprising a central processing unit.

8. An apparatus according to claim 1 or 2, further comprising a transmitter for transmitting signals through a telephone line.

9. An apparatus according to claim 1 or 2, further comprising a recording control circuit for controlling a head for performing recording.

10. An apparatus according to claim 9, wherein said head is an ink jet head for ejecting ink by using a thermal energy.

11. An apparatus according to claim 1 or 2, wherein each of said thin-film transistors has an active layer consisting of non-single-crystal silicon.

12. An apparatus according to claim 11, wherein said non-single-crystal silicon is amorphous silicon.

13. An apparatus according to claim 12, wherein said amorphous silicon is hydrogenated amorphous silicon.

14. An apparatus according to claim 1 or 2, wherein said shift register includes a buffer circuit having an arrangement such that a gate electrode of a first transistor is connected to an input terminal, a main electrode of said first transistor is connected to a gate electrode of a second transistor, a main electrode of said second transistor is used as said output line, a plurality of reset transistors are connected to said gate electrode of said second transistor, and different reset pulses are applied to gate electrodes of said plurality of reset transistors.

* * * * *

UNITED STATES PATENT AND TRADEMARK OFFICE
CERTIFICATE OF CORRECTION

PATENT NO. : 5,812,284
DATED : September 22, 1998
INVENTOR(S) : HIDEMASA MIZUTANI ET AL.

Figure 9:
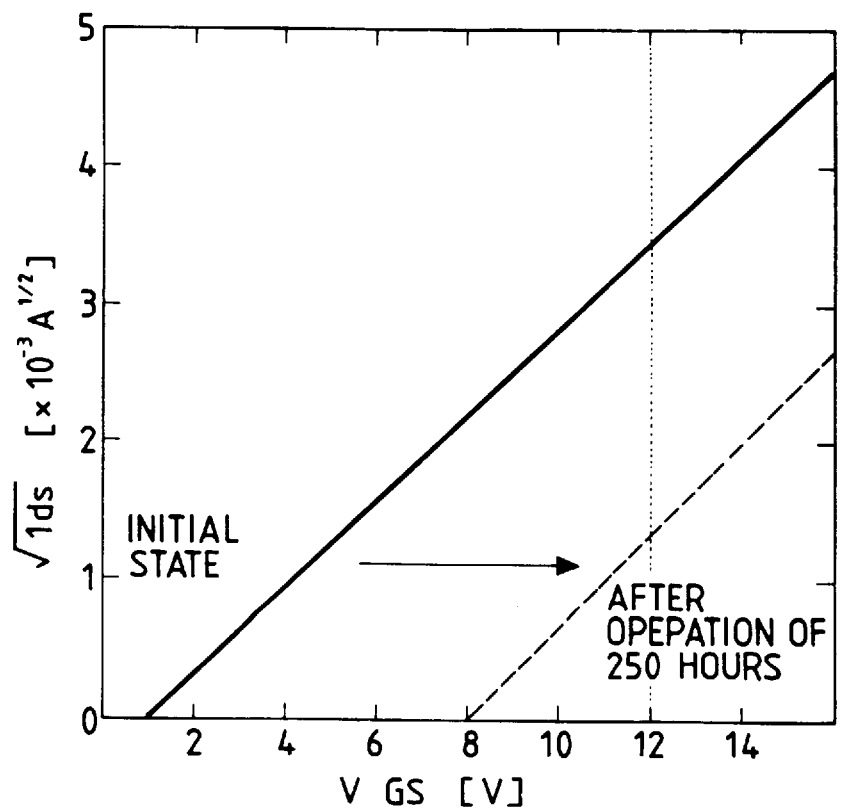
FIG. 9 is a graph showing the relationship between the gate-to-source voltage and the source-to-drain current of a thin-film transistor.

It is certified that error appears in the above-identified patent and that said Letters Patent is hereby corrected as shown below:

<u>IN THE DRAWINGS, FIGURE 9</u>

"OPEPATION" should read --OPERATION--.

<u>COLUMN 5</u>

Line 30, "that" should read --than--.

<u>COLUMN 9</u>

Line 51, "$C_{1j}1$" should read --$C_{1j}$--.

<u>COLUMN 16</u>

Line 41, "S1to" should read --S1 to--.

Signed and Sealed this

First Day of June, 1999

Attest:

Q. TODD DICKINSON

Attesting Officer

Acting Commissioner of Patents and Trademarks